US012679178B2

(12) United States Patent
Cho et al.

(10) Patent No.: US 12,679,178 B2
(45) Date of Patent: Jul. 14, 2026

(54) SLIDING GLASS MODULE AND REAR SLIDING GLASS ASSEMBLY INCLUDING SAME

(71) Applicants: Hyundai Motor Company, Seoul (KR); Kia Corporation, Seoul (KR); Webasto Korea Holdings Ltd., Ulsan (KR)

(72) Inventors: Sung Yong Cho, Hwaseong-si (KR); Keon Han Kang, Ulsan (KR); Ki Jin Nam, Ulsan (KR); Chu Kyoung Kim, Ulsan (KR)

(73) Assignees: Hyundai Motor Company, Seoul (KR); Kia Corporation, Seoul (KR); Webasto Korea Holdings Ltd., Ulsan (KR)

( * ) Notice: Subject to any disclaimer, the term of this patent is extended or adjusted under 35 U.S.C. 154(b) by 0 days.

(21) Appl. No.: 19/075,084

(22) Filed: Mar. 10, 2025

(65) Prior Publication Data

US 2026/0145490 A1 May 28, 2026

(30) Foreign Application Priority Data

Nov. 28, 2024 (KR) ........................ 10-2024-0173767

(51) Int. Cl.
| | |
|---|---|
| *B60J 1/18* | (2006.01) |
| *B60R 16/02* | (2006.01) |
| *B60S 1/02* | (2006.01) |
| *H05B 3/86* | (2006.01) |

(52) U.S. Cl.
CPC ......... *B60J 1/1853* (2013.01); *B60R 16/0207* (2013.01); *B60S 1/026* (2013.01); *H05B 3/86* (2013.01)

(58) Field of Classification Search
None
See application file for complete search history.

(56) References Cited

U.S. PATENT DOCUMENTS

| | | | | |
|---|---|---|---|---|
| 6,586,709 B2 * | 7/2003 | Kim | ......................... | H05B 3/84 |
| | | | | 219/541 |
| 6,793,259 B2 * | 9/2004 | Sano | .................... | B60R 16/0207 |
| | | | | 49/502 |
| 6,930,244 B1 * | 8/2005 | Nebel | ................. | B60R 16/0207 |
| | | | | 248/65 |
| 7,155,863 B2 * | 1/2007 | Daniel | .................... | B60J 1/1853 |
| | | | | 292/DIG. 6 |
| 7,265,294 B2 * | 9/2007 | Tsunoda | ................. | H02G 11/00 |
| | | | | 174/72 A |
| 7,381,898 B2 * | 6/2008 | Ide | ....................... | H02G 11/006 |
| | | | | 174/72 A |

(Continued)

FOREIGN PATENT DOCUMENTS

| | | | | | | |
|---|---|---|---|---|---|---|
| CN | 109367365 A | * | 2/2019 | ............. | B60S 1/586 |
| DE | 112017002492 T5 | * | 2/2019 | ......... | B60R 16/0215 |

(Continued)

*Primary Examiner* — Catherine A Kelly
(74) *Attorney, Agent, or Firm* — Slater Matsil, LLP

(57) ABSTRACT

In an embodiment a sliding glass system includes a rail, a sliding glass portion having a heating wire, the sliding glass portion being slidably connected to the rail, and a wire harness portion configured to supply power to the heating wire, wherein at least part of the wire harness portion is connected to the heating wire via the inside of the rail.

20 Claims, 20 Drawing Sheets

(56) References Cited

U.S. PATENT DOCUMENTS

| | | | | |
|---|---|---|---|---|
| 7,568,312 B2 * | 8/2009 | Dufour | .................. | B60J 1/1853 |
| | | | | 49/413 |
| 7,900,863 B1 * | 3/2011 | Cheng | ................ | B65H 75/4434 |
| | | | | 242/378.1 |
| 8,042,664 B2 * | 10/2011 | Rutkowski | ............. | H02G 11/02 |
| | | | | 191/12.2 A |
| 8,402,695 B2 * | 3/2013 | Smith | .................... | B60J 1/1853 |
| | | | | 49/413 |
| 8,881,458 B2 * | 11/2014 | Snider | ....................... | E05C 1/08 |
| | | | | 49/213 |
| 9,579,955 B2 * | 2/2017 | Snider | .................... | B60J 1/1853 |
| 9,688,122 B2 * | 6/2017 | Gipson | .................... | H05B 3/84 |
| 10,015,843 B2 * | 7/2018 | Ackerman | .............. | H05B 3/84 |
| 10,407,001 B2 * | 9/2019 | Kogure | .................. | B60R 16/03 |
| 10,524,313 B2 * | 12/2019 | Snider | .................. | B32B 17/061 |
| 10,882,382 B2 * | 1/2021 | Otsubo | .................. | E05F 11/04 |
| 11,013,069 B2 * | 5/2021 | Lahnala | ................ | E05F 11/535 |
| 11,458,819 B2 * | 10/2022 | Kim | ........................... | B60J 1/16 |
| 2006/0254797 A1 * | 11/2006 | Charara | ................. | H02G 11/00 |
| | | | | 174/72 A |
| 2012/0117880 A1 * | 5/2012 | Lahnala | ................. | B60J 1/1853 |
| | | | | 49/70 |
| 2012/0291353 A1 * | 11/2012 | Gipson | ................... | B60S 1/026 |
| | | | | 49/70 |
| 2023/0084191 A1 * | 3/2023 | Snider | ...................... | H05B 3/84 |
| | | | | 296/146.16 |
| 2025/0026185 A1 * | 1/2025 | Snider | .................... | B60S 1/026 |

FOREIGN PATENT DOCUMENTS

| | | | | | |
|---|---|---|---|---|---|
| JP | | S6160345 A | * | 3/1986 | ............ E05F 11/445 |
| JP | | S6160346 A | * | 3/1986 | ......... B60R 16/0207 |
| WO | WO-2004034540 A1 | | * | 4/2004 | .............. B60N 2/06 |
| WO | WO-2006013884 A1 | | * | 2/2006 | ......... B60R 16/0215 |
| WO | WO-2015014712 A1 | | * | 2/2015 | ............... B60J 1/16 |

* cited by examiner

SLIDING GLASS MODULE AND REAR SLIDING GLASS ASSEMBLY INCLUDING SAME

CROSS-REFERENCE TO RELATED APPLICATIONS

This application claims benefit of priority to Korean Patent Application No. 10-2024-0173767 filed on Nov. 28, 2024 in the Korean Intellectual Property Office, the disclosure of which is incorporated herein by reference in its entirety.

TECHNICAL FIELD

The present disclosure relates to a sliding glass module and a rear sliding glass assembly including the same.

BACKGROUND

A rear glass is mainly installed on the rear of a pickup truck cabin and has a feature in which a portion of the window connecting the inside and the outside of a vehicle may be opened and closed in a sliding manner. Such a rear glass includes, for example, a fixed glass fixed to the rear of the vehicle, a sliding glass provided to be slidable from the fixed glass to open and close an opening formed in the fixed glass, a wiring harness supplying power to a heating wire formed in the fixed glass and the sliding glass, and a rail guiding the movement of the sliding glass.

SUMMARY

An embodiment of the present disclosure can provide a sliding glass module with improved water-tightness and a rear sliding glass assembly including the same.

An embodiment of the present disclosure can provide a sliding glass module capable of stably connecting a wire harness and a heating wire, and a rear sliding glass assembly including the same.

An embodiment of the present disclosure can provide a sliding glass module with improved product appearance and a rear sliding glass assembly including the same.

According to an embodiment of the present disclosure, a sliding glass module can include: a rail; a sliding glass portion having a heating wire, the sliding glass portion being slidably connected to the rail; and a wire harness portion supplying power to the heating wire, wherein at least a portion of the wire harness portion is connected to the heating wire via the inside of the rail.

According to an embodiment of the present disclosure, a rear sliding glass assembly can include: a fixed glass module installed in a vehicle and having an opening; and a sliding glass module connected to the fixed glass module capable of opening and closing the opening.

BRIEF DESCRIPTION OF THE DRAWINGS

The above and other features and advantages of example embodiments of the present disclosure can be more clearly understood from the following detailed description, taken in conjunction with the accompanying drawings, in which.

DETAILED DESCRIPTION OF ILLUSTRATIVE EMBODIMENTS

Figure 1:
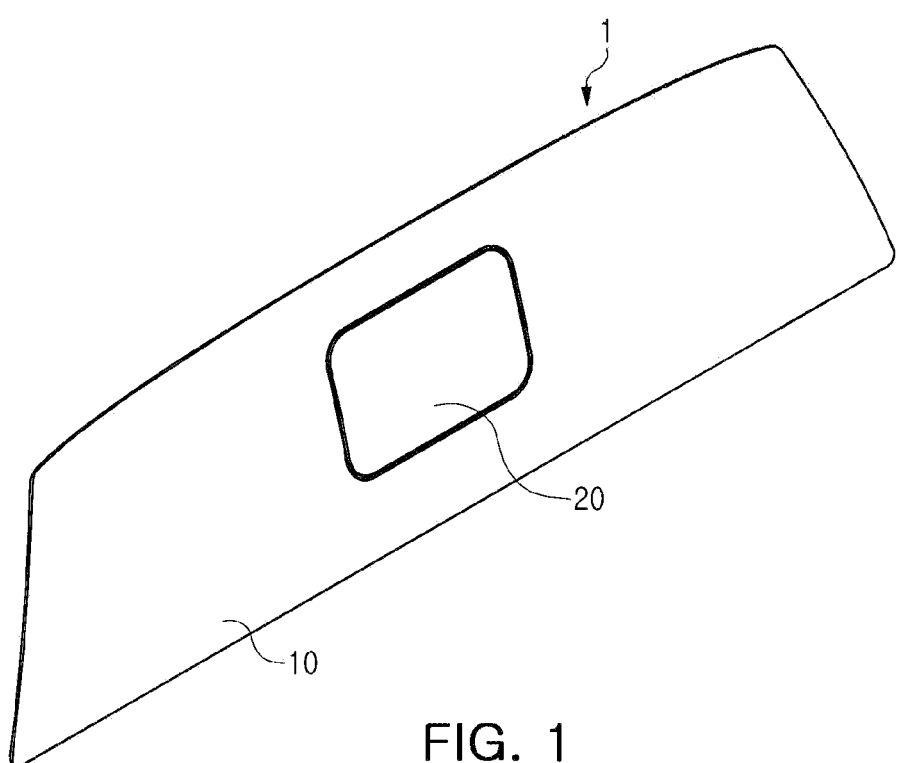
FIG. 1 is an external perspective view of a rear sliding glass assembly according to an embodiment of the present disclosure.

Embodiments of the present disclosure may be modified in various ways and take on various alternative forms, and example embodiments thereof are shown in the drawings and described in detail below. However, it can be understood that there is no intent to necessarily limit the present disclosure to the particular forms disclosed, but on the contrary, the present disclosure covers all modifications, equivalents, and alternatives falling within the spirit and scopes of the present disclosure.

It can be understood that, although the terms "first," "second," etc. may be used herein to describe various elements, these elements are not necessarily limited by these terms. These terms can be used merely to distinguish one element from another. For example, a first element could be termed a second element, and a second element could similarly be termed a first element without departing from the scopes of the present disclosure. As used herein, the term "and/or" includes any and all combinations of one or more of the associated listed items.

The terms used herein to describe example embodiments of the present disclosure are not intended to necessarily limit the scopes of the present disclosure. The articles "a," and "an" are singular in that they have a single referent, however the use of the singular form in the present document does not necessarily preclude the presence of more than one referent. In other words, elements of an example embodiment of the present disclosure referred to in the singular may number one or more, unless the context clearly indicates otherwise. It can be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, terms used herein, including technical and scientific terms, can have same meanings as understood by those skilled in the art to which the present disclosure pertains. Such terms as defined in generally used dictionaries can be construed to have same meanings as those of the contexts of the related art.

In the description below, terms "forward," "backward," "lateral," "front," "rear," "vertical," "above," "upper," "lower," "horizontal," etc. used in relation to directions are described based on the illustration in the drawing. Hereinafter, example embodiments of the present disclosure will be described with reference to the accompanying drawings.

Figure 2:
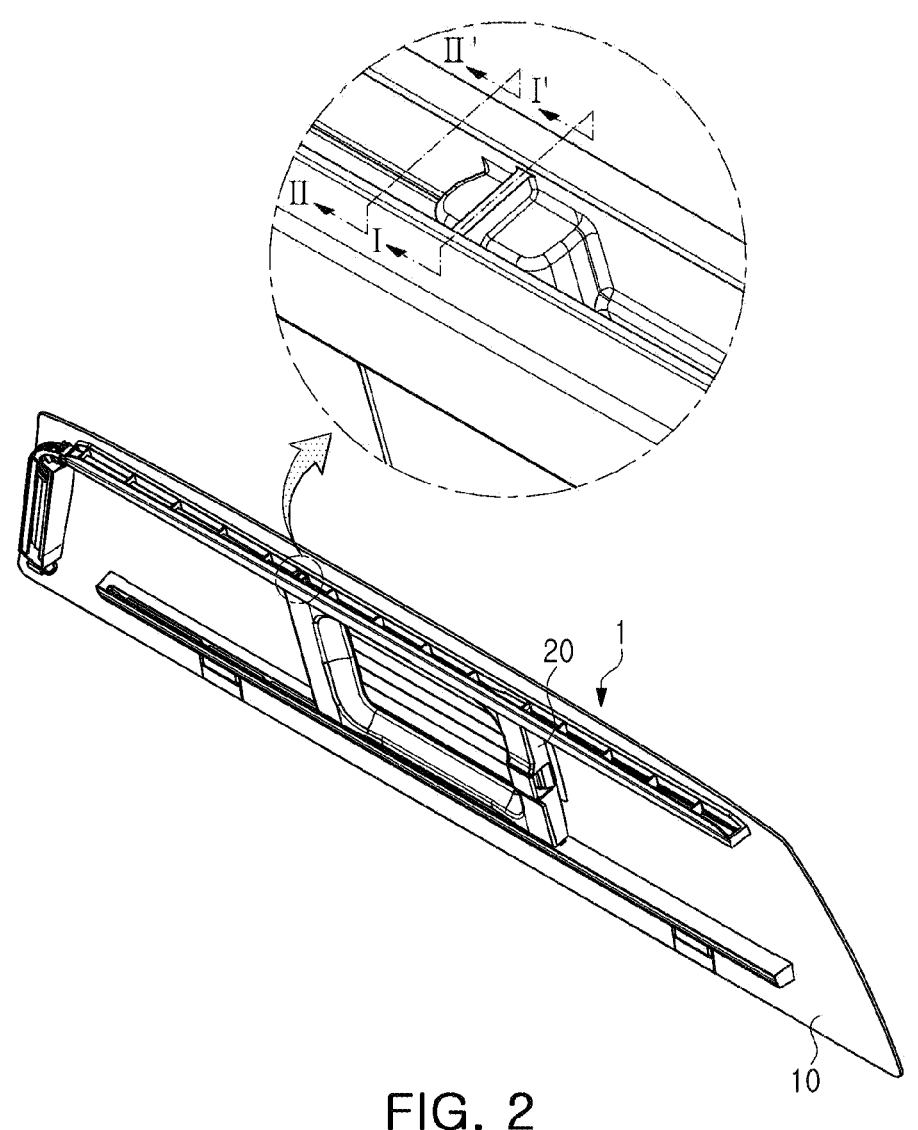
FIG. 2 is an internal perspective view of a rear sliding glass assembly according to an embodiment of the present disclosure.
Figure 3:
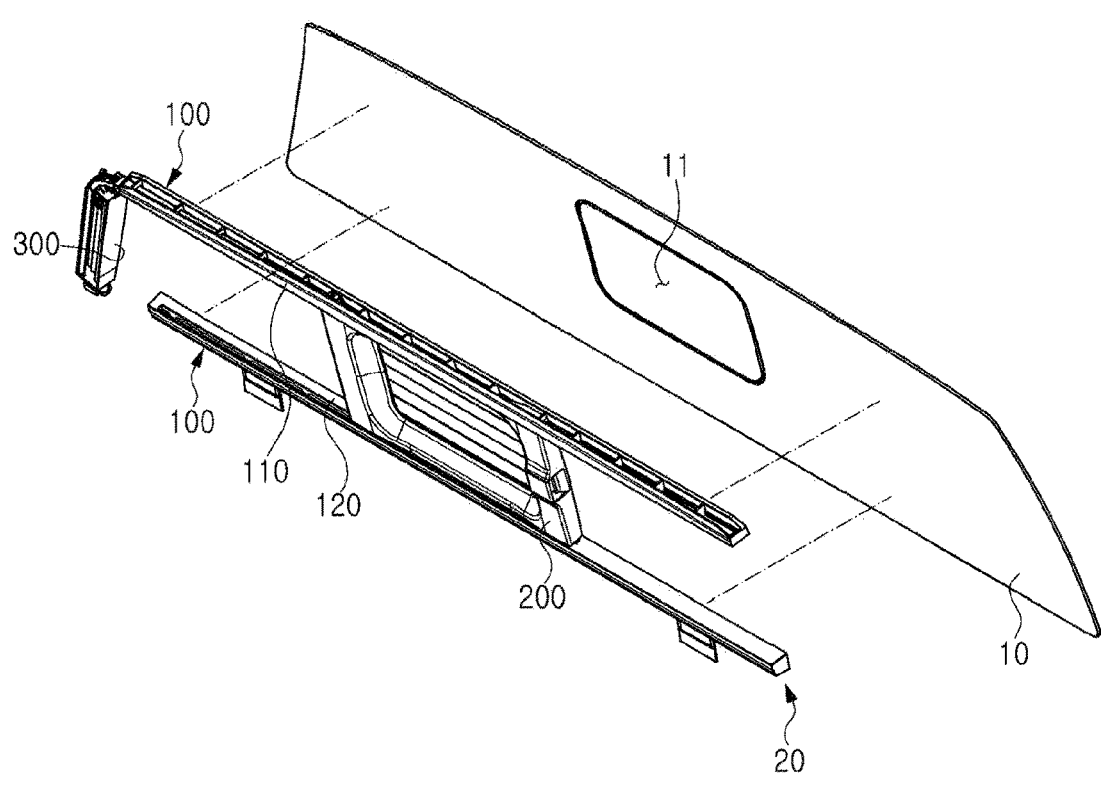
FIG. 3 is an exploded perspective view of a rear sliding glass assembly according to an embodiment of the present disclosure.

FIG. 1 is an external perspective view of a rear sliding glass assembly according to an embodiment of the present disclosure. FIG. 2 is an internal perspective view of a rear sliding glass assembly according to an embodiment of the present disclosure. FIG. 3 is an exploded perspective view of a rear sliding glass assembly according to an embodiment of the present disclosure.

Referring to FIGS. 1 to 3, a rear sliding glass assembly 1 according to an embodiment of the present disclosure may be installed at the rear of a vehicle. The rear sliding glass assembly 1 may selectively connect the interior and the exterior of the vehicle. For example, the rear sliding glass assembly 1 may include an opening 11, and the internal and external spaces of the vehicle may be connected or separated by operating the opening and closing of the opening 11.

The rear sliding glass assembly 1 may include, for example, a fixed glass module 10 and a sliding glass module 20.

The fixed glass module 10 may be fixed to the rear of the vehicle. The fixed glass module 10 may include a transparent material. The fixed glass module 10 may be connected to the rear of the vehicle through a separate frame or bracket. A sealing member (not shown) for water-tightness may be provided on the edge of the fixed glass module 10. The opening 11 may be provided on the inside of the fixed glass module 10. The opening 11 may be opened and closed by the sliding glass module 20.

The fixed glass module 10 may include the sliding glass module 20. The sliding glass module 20 may open and close the opening 11 of the fixed glass module 10. For example, the sliding glass module 20 may include a sliding glass portion 200 that may slide, and the opening 11 of the fixed glass module 10 may be opened and closed as the sliding glass portion 200 slides.

Figure 4:
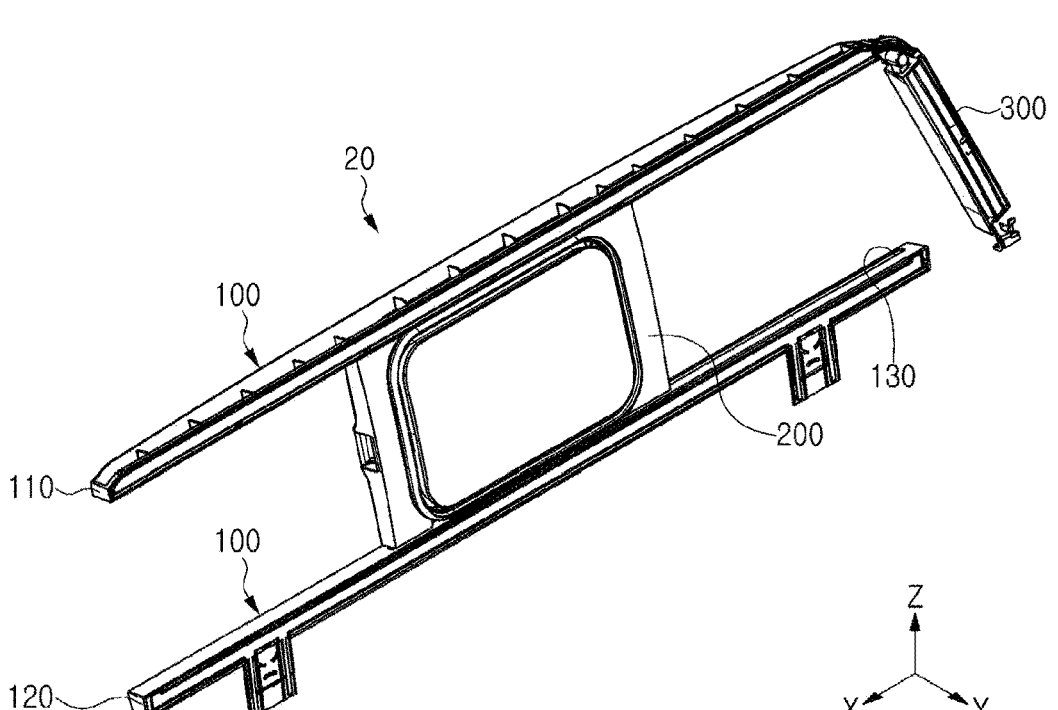
FIG. 4 is a perspective view of a sliding glass module according to an embodiment of the present disclosure.
Figure 5:
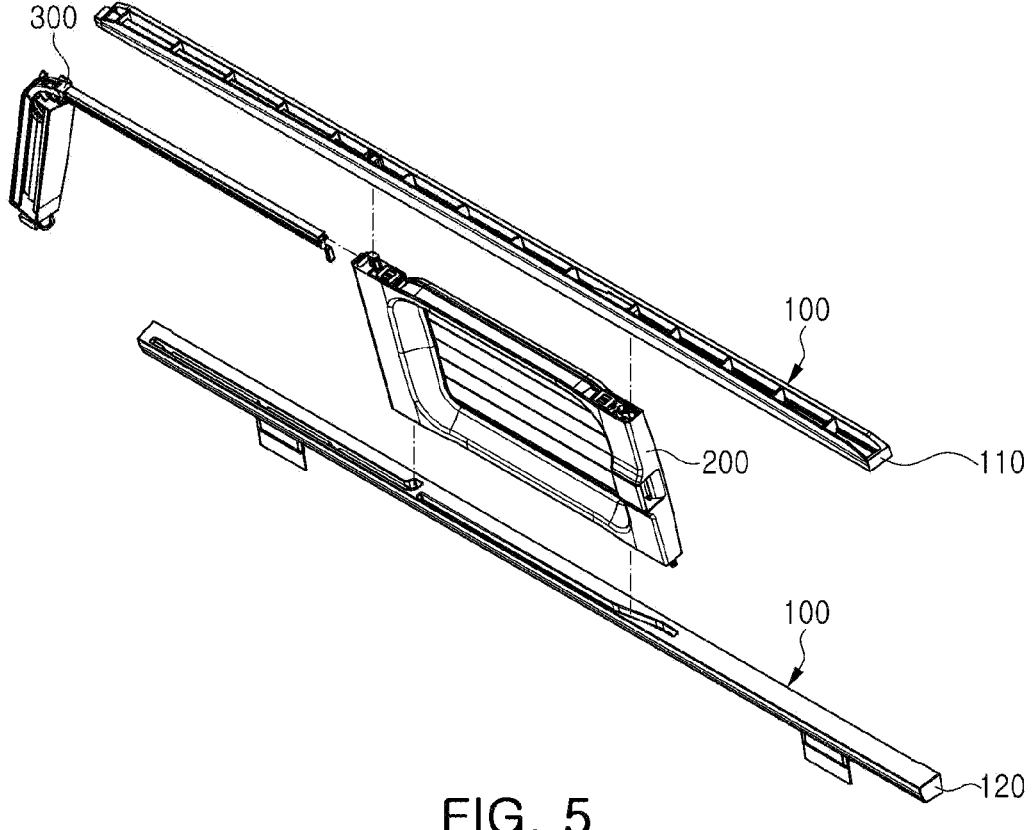
FIG. 5 is an exploded perspective view of a sliding glass module according to an embodiment of the present disclosure.
Figure 6:
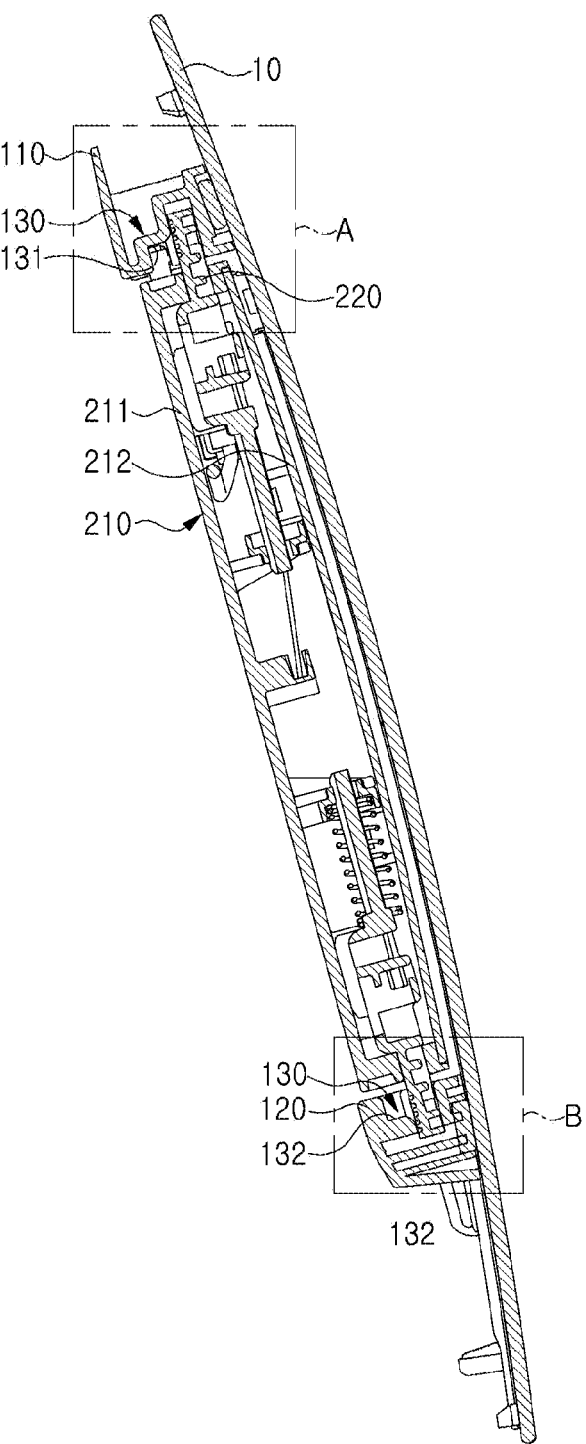
FIG. 6 is a cross-sectional view taken along line I-I' of FIG. 2.

FIG. 4 is a perspective view of the sliding glass module according to an embodiment of the present disclosure. FIG. 5 is an exploded perspective view of the sliding glass module according to an embodiment of the present disclosure. FIG. 6 is a cross-sectional view taken along line I-I' of FIG. 2.

Referring to FIGS. 4 to 6, the sliding glass module 20 may include, for example, a rail 100, the sliding glass portion 200, and a wire harness portion 300.

The rail 100 may be connected to the fixed glass module 10. The rail 100 may guide a movement path of the sliding glass portion 200. The rail 100 may include, for example, an upper rail 110 provided on an upper portion of the fixed glass module 10, that is, above the sliding frame 210, and a lower rail 120 provided on a lower portion of the fixed module 10, that is, below the sliding frame 210. The rail 100 may include a guide groove 130. The sliding glass portion 200 may slide along the guide groove 130. The guide groove 130 may include an upper guide groove 131 (also shown in FIG. 7) provided on the upper rail 110 and a lower guide groove 132 (also shown in FIG. 10) provided on the lower rail 120. A portion of the sliding glass portion 200 can be inserted into the upper guide groove 131 and the lower guide groove 132.

At least a portion of upper and lower ends of the sliding glass portion 200 may be inserted into the upper rail 110 and the lower rail 120, respectively. For example, at least a portion of the upper and lower ends of the sliding glass portion 200 may be inserted into the guide groove 130 of the rail 100.

The sliding glass portion 200 may slide along the rail 100 while the upper and lower portions are inserted into the upper rail 110 and the lower rail 120, respectively. The opening 11 of the fixed glass module 10 may be provided between the upper rail 110 and the lower rail 120. Therefore, the opening 11 may be opened and closed as the sliding glass portion 200 slides.

Figure 12:
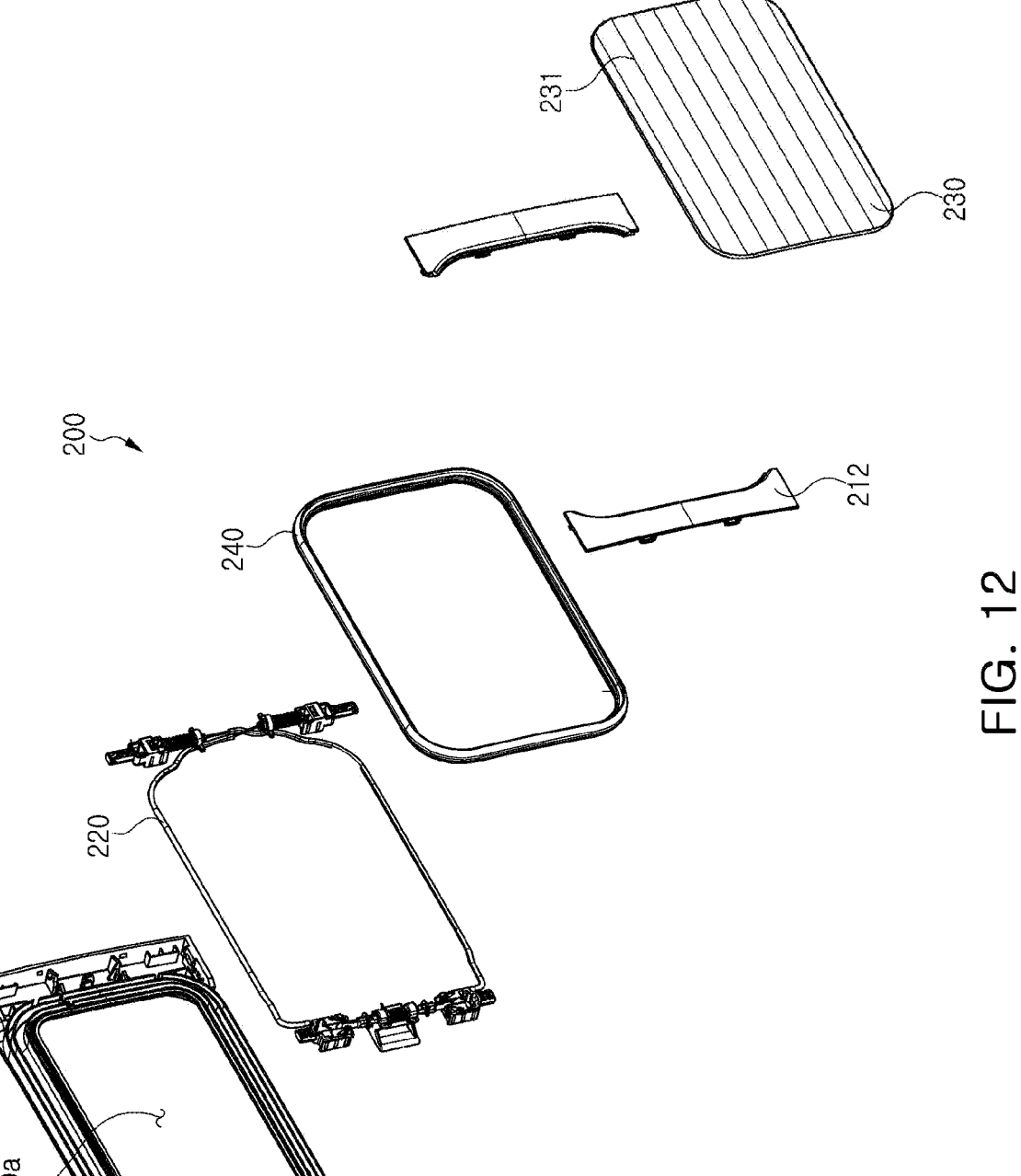
FIG. 12 is an exploded perspective view of a sliding glass portion according to an embodiment of the present disclosure.

Referring to FIG. 12, a sliding glass 230 of the sliding glass portion 200 may include a heating wire 231. The heating wire 231 may be provided to remove frost, etc., from the sliding glass 230. The heating wire 231 may be connected to the wire harness portion 300 and supplied with power.

The wire harness portion 300 may be connected to an external power source and supply power to the heating wire 231. At least a portion of the wire harness portion 300 may be connected to the heating wire 231 via the inside of the rail 100. The wire harness portion 300 may be coupled to the fixed glass module 10.

Referring to FIGS. 16 and 18-20, the wire harness portion 300 may include a cable 330 connected to an external power source. One end portion of the cable 330 may be drawn into the inside of the sliding frame 210 and connected to the heating wire 231, and the other end portion thereof may be connected to an external power source. The cable 330 may be drawn into or drawn out of a storage case 340 as the sliding glass portion 200 slides.

Figure 7:
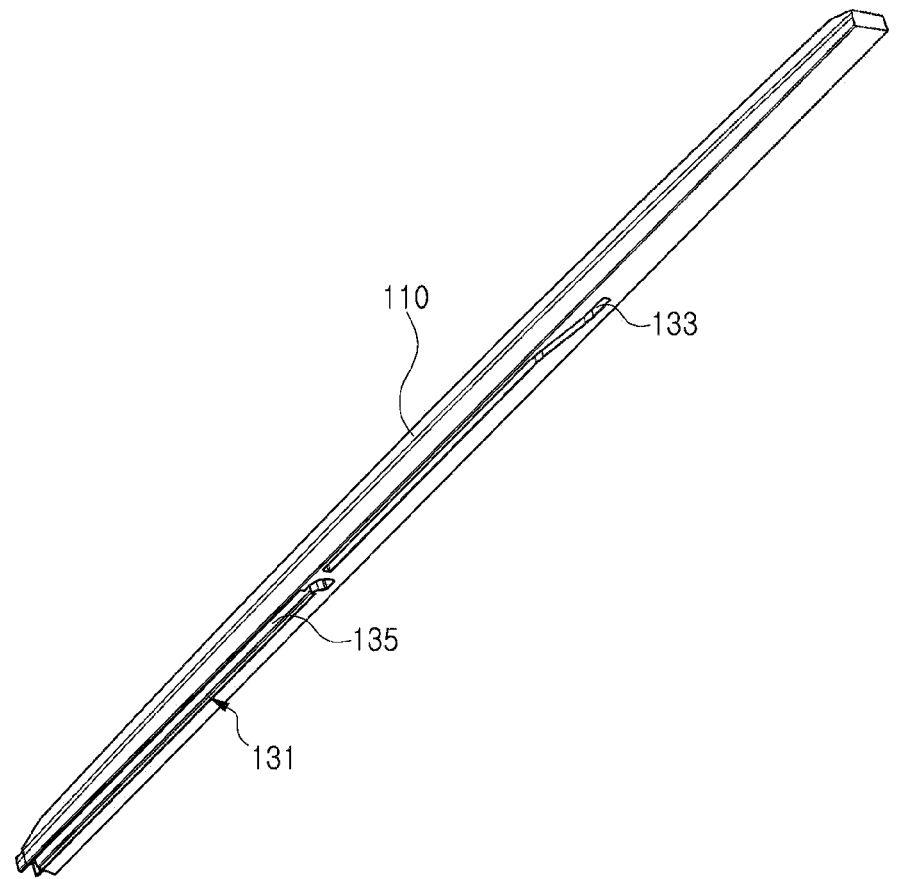
FIG. 7 is a bottom perspective view of an upper rail according to an embodiment of the present disclosure.
Figure 8:
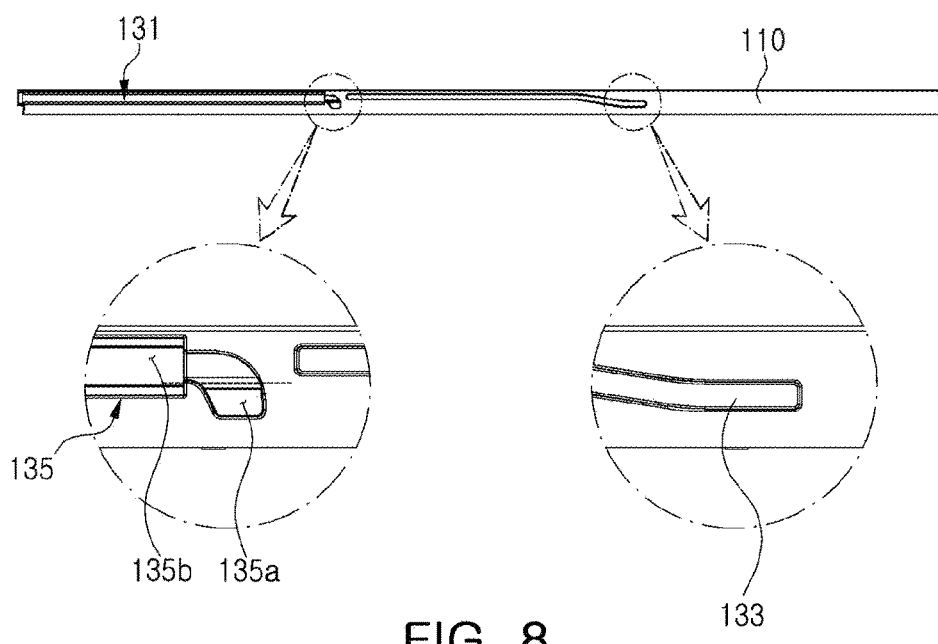
FIG. 8 is a bottom view of an upper rail according to an embodiment of the present disclosure.
Figure 9:
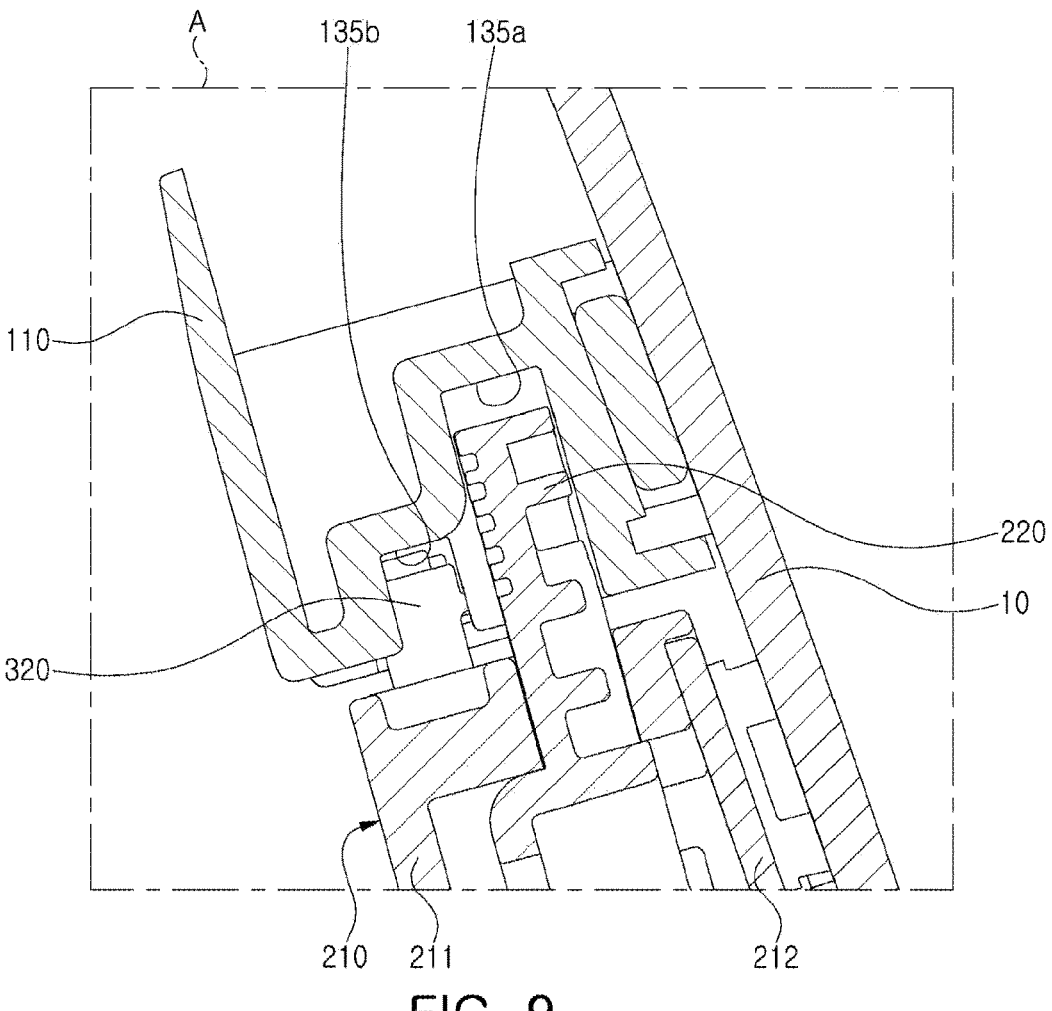
FIG. 9 is an enlarged view of portion A of FIG. 6.

FIG. 7 is a bottom perspective view of the upper rail 110 according to an embodiment of the present disclosure. FIG. 8 is a bottom view of the upper rail 110 according to an embodiment of the present disclosure. FIG. 9 is an enlarged view of portion A of FIG. 6.

Referring to FIGS. 7 to 9, the upper rail 110 may include an upper guide groove 131. The upper guide groove 131 may be provided on a bottom surface of the upper rail 110. For example, the upper guide groove 131 may be formed as a portion of the bottom surface of the upper rail 110 retracts inwardly by a predetermined depth.

The upper guide groove 131 may include a first upper guide groove 133 provided on one side of the upper rail 110 in a length direction and a second upper guide groove 135 provided on the other side of the upper rail 110 in the length direction.

The second upper guide groove 135 may include an upper fixed groove part 135a and an upper movable groove part 135b. The upper fixed groove part 135a may be formed to retract by a predetermined depth inwardly from the bottom surface of the upper rail 110. A recessed length of the upper fixed groove part 135a may be longer than a recessed length of the upper movable groove part 135b. The upper movable groove part 135b may be recessed inwardly from the bottom surface of the upper rail 110 so as to be connected to the upper fixed groove part 135a in a width direction of the upper rail 110. The upper movable groove part 135b may extend in the length direction of the upper rail 110. The upper fixed groove part 135a and the upper movable groove part 135b may be coupled continuously to each other.

Figure 10:
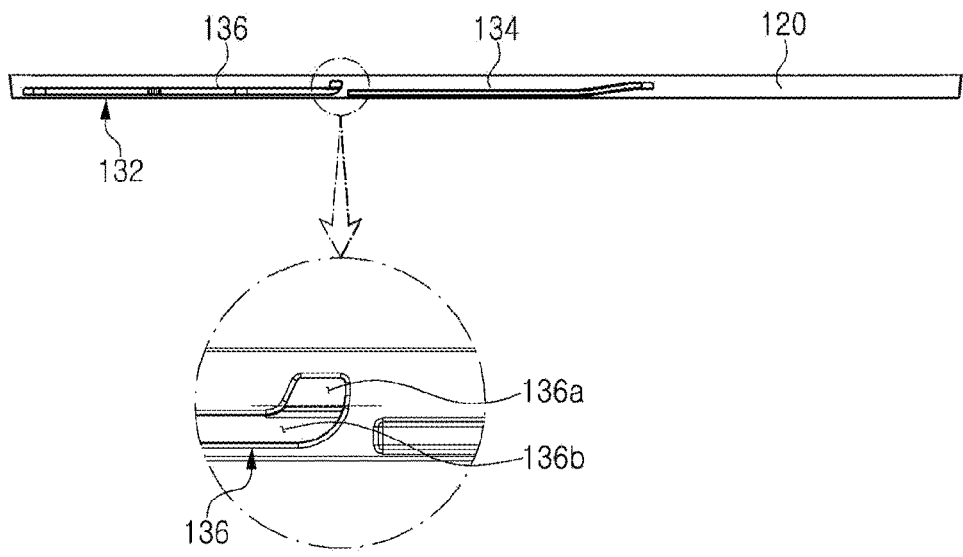
FIG. 10 is a plan view of a lower rail according to an embodiment of the present disclosure.
Figure 11:
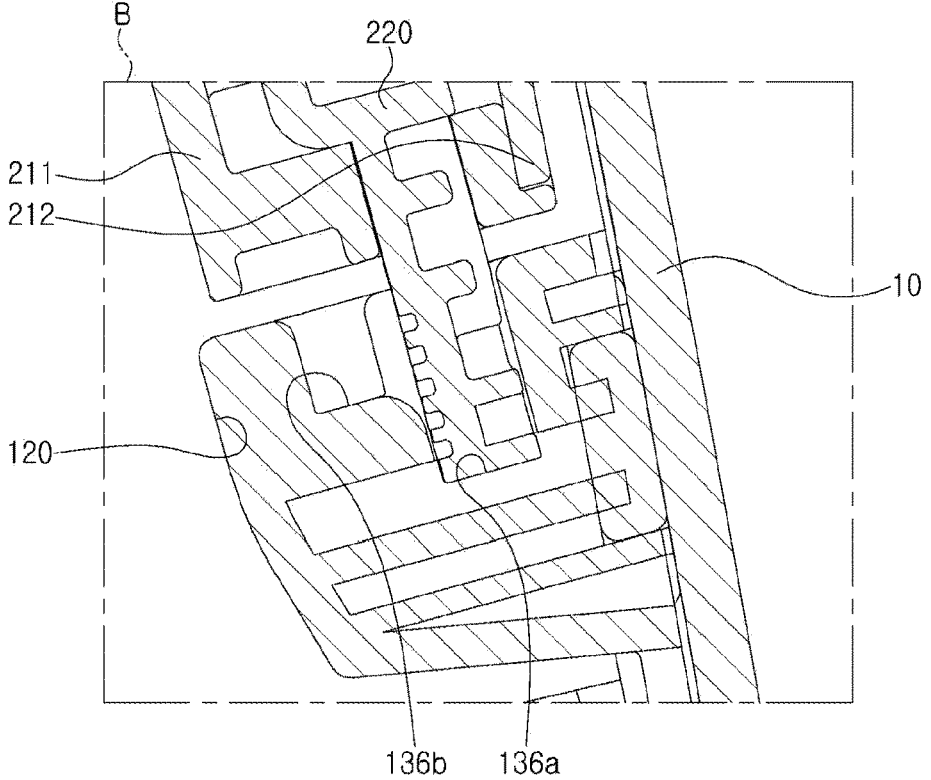
FIG. 11 is an enlarged view of portion B of FIG. 6.

FIG. 10 is a plan view of the lower rail according to an embodiment of the present disclosure. FIG. 11 is an enlarged view of portion B of FIG. 6.

Referring to FIGS. 10 and 11, the lower guide groove 132 may be provided on the lower rail 120. The lower guide groove 132 may be provided on an upper surface of the lower rail 120. For example, the lower guide groove 132 may be formed as a portion of the upper surface of the lower rail 120 and recessed inwardly by a predetermined depth. The lower guide groove 132 may include, for example, a first lower guide groove 134 provided on one side of the lower rail 120 in the length direction and a second lower guide groove 136 provided on the other side of the lower rail 120 in the length direction.

The first lower guide groove 134 may extend in the length direction from an upper surface of the lower rail 120. The first lower guide groove 134 may be provided in a shape corresponding to the first upper guide groove 133.

The second lower guide groove 136 may be provided on the upper surface of the lower rail 120 and spaced apart from the first lower guide groove 134 in the length direction. The second lower guide groove 136 may be provided in a shape corresponding to the second upper guide groove 135. The second lower guide groove 136 may include, for example, a lower fixed groove part 136a recessed inwardly from the upper surface of the lower rail 120 by a predetermined depth and a lower movable groove part 136b recessed inwardly from the upper surface of the lower rail 120 by a predetermined depth so as to be connected to the lower fixed groove part 136a in the width direction of the lower rail 120 and extending in the length direction of the lower rail 120. The lower fixed groove part 136a may be provided to be symmetrical with the upper fixed groove part 135a. The lower movable groove part 136b may be provided to be symmetrical with the upper movable groove part 135b. The lower guide groove 132 and the upper guide groove 131 may be provided to be symmetrical with each other.

Figure 13:
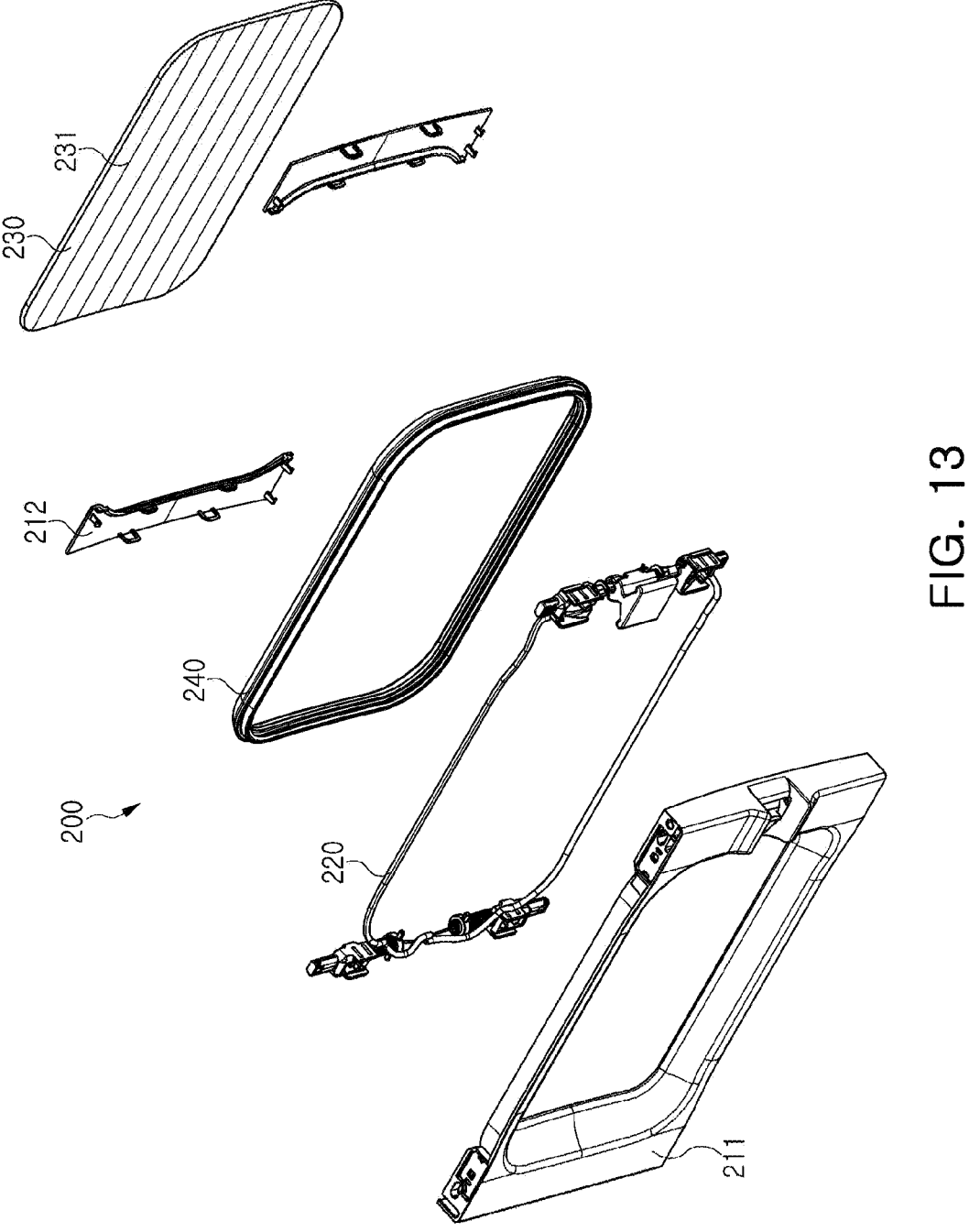
FIG. 13 is an exploded perspective view of a sliding glass portion according to an embodiment of the present disclosure viewed from a different direction than FIG. 12.

FIG. 12 is an exploded perspective view of the sliding glass portion according to an embodiment of the present disclosure. FIG. 13 is an exploded perspective view of the sliding glass portion viewed in a direction different from that of FIG. 12 according to an embodiment of the present disclosure.

Referring to FIGS. 12 and 13, the sliding glass portion 200 may open and close the opening 11 of the fixed glass module 10 while sliding along the rail 100. The sliding glass portion 200 may include, for example, a sliding frame 210, a locking portion 220, a sliding glass 230, and a weather strip 240.

The sliding frame 210 may include a case 211 and a cover 212. The case 211 may include an opening 210a. Various components required for operation of the sliding glass module 20 may be accommodated inside the case 211. The cover 212 may be coupled to the case 211. The cover 212 may prevent components provided inside the case 211 from being exposed externally. When the case 211 and the cover 212 are coupled to each other, the sliding frame 210 may have an overall rectangular frame shape.

The sliding frame 210 may include the locking portion 220. The locking portion 220 may fix the sliding frame 210 to the rail or switch the sliding frame 210 into slidably movable state. For example, referring to FIGS. 12, 13, and 15, when a handle module 223 of the locking portion 220 rotates in one direction, the sliding frame 210 may be switched to a slidably movable state. After the sliding frame 210 is switched to a slidably movable state by the locking portion 220, a user may move the sliding frame 210 by applying external force to the handle module 223.

The sliding glass 230 may be coupled to the sliding frame 210. The sliding glass 230 may be coupled to the sliding frame 210 to block the opening 210a of the sliding frame 210. The sliding glass 230 may be provided with the heating wire 231. The heating wire 231 may be provided to remove frost from the sliding glass 230.

The weather strip 240 may be provided for water-tightness or air-tightness between the sliding frame 210 and the fixed glass module 10. The weather strip 240 may be provided to wrap around the edge of the sliding glass 230. The weather strip may include, for example, silicone rubber, polyvinyl chloride (PVC), thermoplastic elastomer (TPE), and/or ethylene propylene diene monomer (EPDM), for example. The weather strip 240 may be formed of various materials commonly used in the art to which the present disclosure pertains. The weather strip 240 may be compressed between the sliding frame 210 and the fixed glass module 10. The compressed state of the weather strip 240 may be maintained by the locking portion 220. When the locking portion 220 maintains the sliding frame 210 fixed to the rail 100, the weather strip 240 may be compressed. When the locking portion 220 switches the sliding frame 210 to a movable state, the weather strip 240 may push the sliding frame 210 in the width direction by a predetermined length so as to be released from the compressed state.

The sliding glass portion 200 may include a flush structure. In other words, an outer surface of the sliding glass 230 may be provided in a form that is smoothly integrated with an outer surface of the fixed glass module 10. Therefore, a step between the sliding glass portion 200 and the fixed glass module 10 may be minimized to improve the watertight performance and the appearance of the product.

Figure 14:
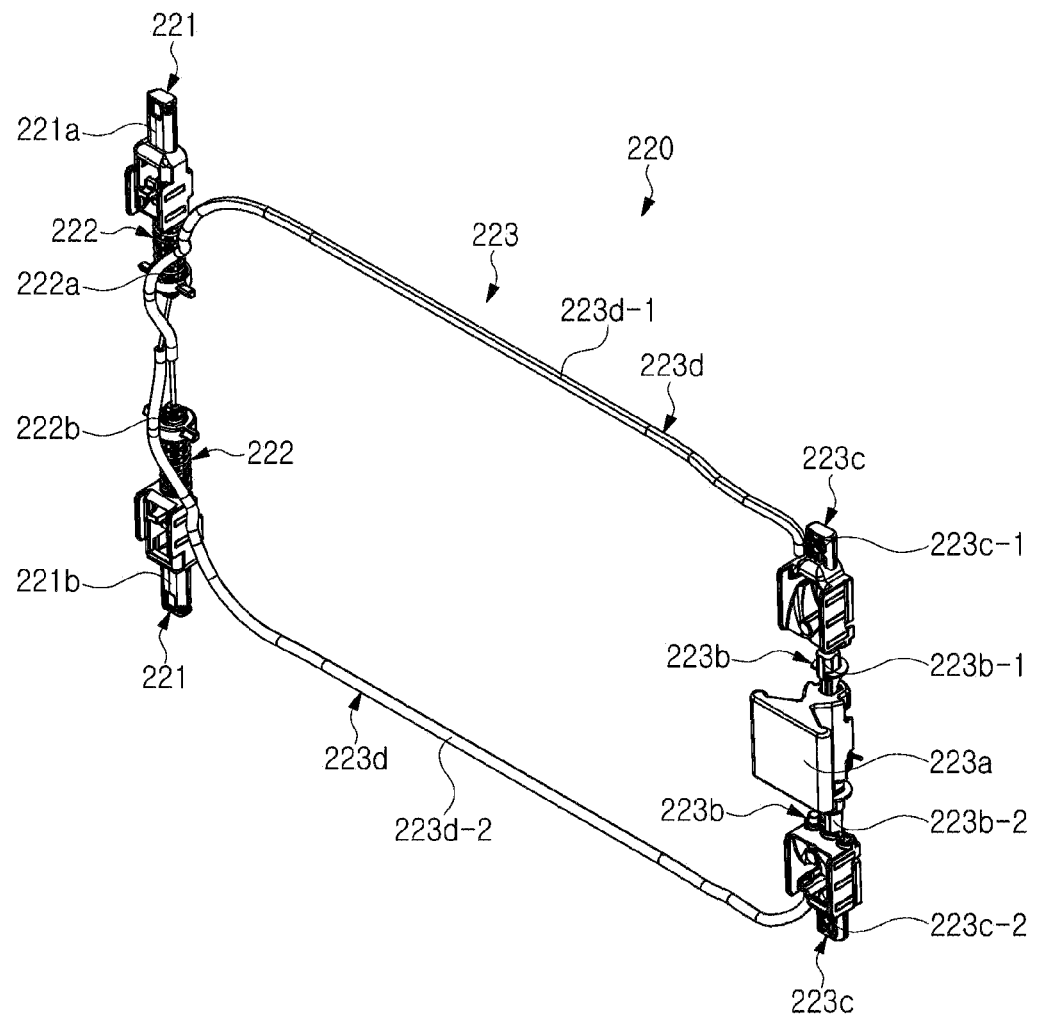
FIG. 14 is a perspective view of a locking portion according to an embodiment of the present disclosure.
Figure 15:
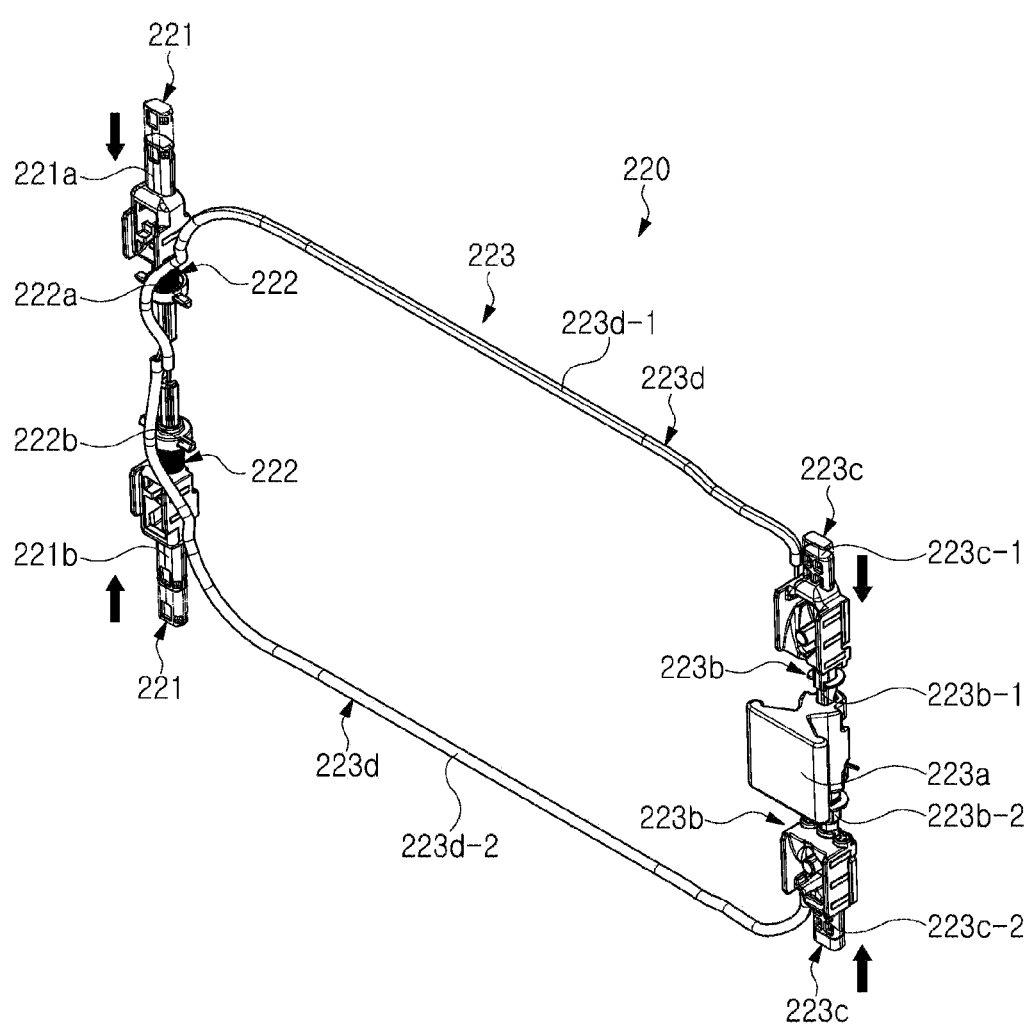
FIG. 15 is a perspective view illustrating a state in which a guide stopper is pulled inwardly of a sliding frame in a locking portion according to an embodiment of the present disclosure.
Figure 16:
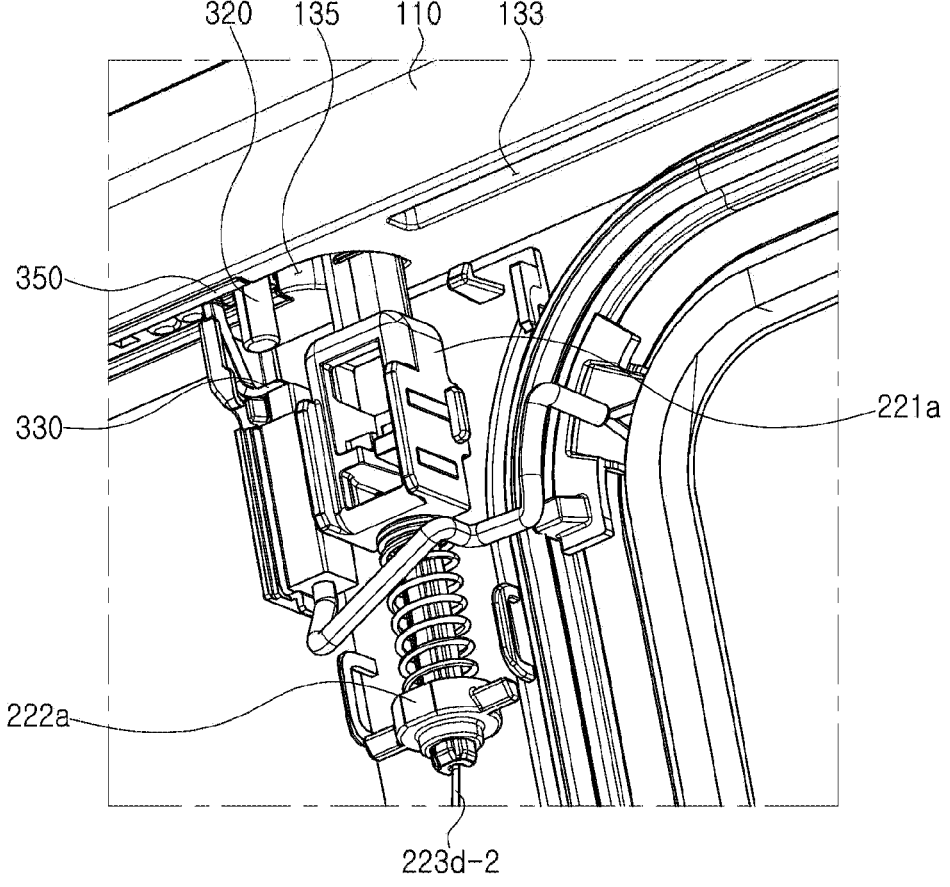
FIG. 16 is a partial perspective view illustrating a state in which a guide stopper is inserted into a guide groove of a rail according to an embodiment of the present disclosure.
Figure 17A:
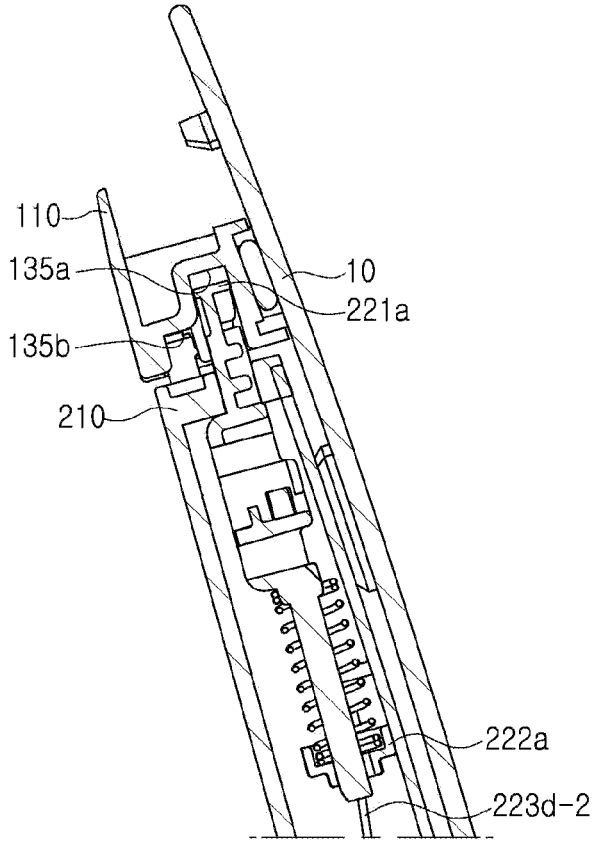
FIGS. 17A and 17B show cross-sectional views illustrating states in which a sliding glass portion is converted from a fixed state to a movable state according to an embodiment of the present disclosure.
Figure 17B:
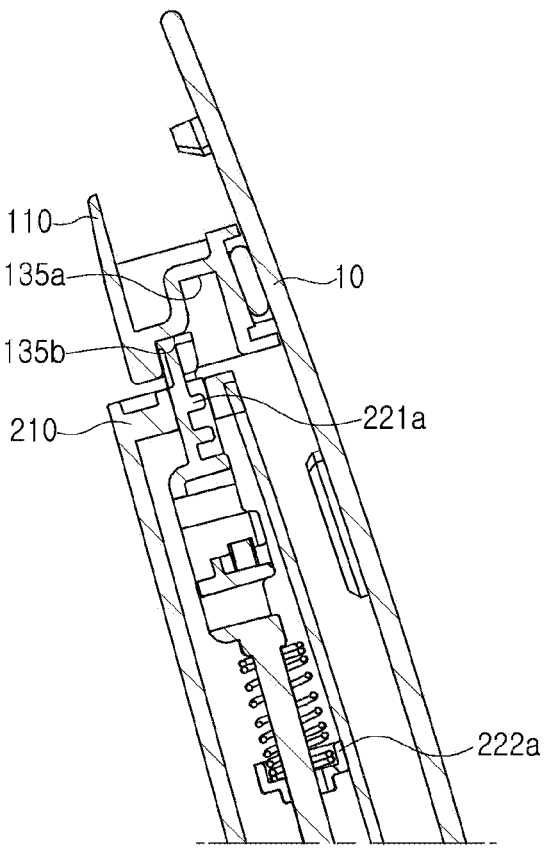

FIG. 14 is a perspective view of the locking portion according to an embodiment of the present disclosure. FIG. 15 is a perspective view illustrating a state in which a guide stopper is pulled inwardly of a sliding frame in the locking portion according to an embodiment of the present disclosure. FIG. 16 is a partial perspective view illustrating a state in which the guide stopper is inserted into the guide groove of the rail according to an embodiment of the present disclosure. FIGS. 17A and 17B show cross-sectional views illustrating states in which the sliding glass portion is switched from a fixed state to a movable state according to an embodiment of the present disclosure.

Referring to FIGS. 14 to 17B, the locking portion 220 may be provided on the sliding frame 210. The locking portion 220 may fix the sliding frame 210 or switch the sliding frame 210 to a slidably movable state. The locking portion 220 may include, for example, a guide stopper 221, a guide stopper elastic support portion 222, and the handle module 223. One side of the guide stopper 221 may be exposed to the outside of the sliding frame 210. The guide stopper 221 may be inserted into the guide groove 130 formed in the rail 100. Depending on the position of the guide groove 130 in which the guide stopper 221 is disposed, the sliding frame 210 may be switched to a fixed state or a movable state.

The guide stopper 221 may include an upper guide stopper 221a and a lower guide stopper 221b. The upper guide stopper 221a may be provided at an upper part of the sliding frame 210. One end portion of the upper guide stopper 221a may be exposed on an upper side of the sliding frame 210. The upper guide stopper 221a may be inserted into the upper guide groove 131. For example, one end portion of the upper guide stopper 221a exposed at the upper side of the sliding frame 210 may be inserted into the upper guide groove 131. The lower guide stopper 221b may be provided at a lower part of the sliding frame 210. One end portion of the lower guide stopper 221b may be exposed on a lower side of the sliding frame 210. The lower guide stopper 221b may be inserted into the lower guide groove 132. For example, one end portion of the lower guide stopper 221b exposed at the lower side of the sliding frame 210 may be inserted into the lower guide groove 132.

Depending on the positions of the upper guide stopper 221a and the lower guide stopper 221b, the sliding frame 210 may be switched to a fixed state or a movable state. For example, when the upper guide stopper 221a is disposed on the upper fixed groove part 135a and the lower guide stopper 221b is disposed on the lower fixed groove part 136a, the sliding frame 210 may be in a fixed state. When the upper guide stopper 221a is disposed on the upper movable groove part 135b and the lower guide stopper 221b is disposed on the lower movable groove part 136b, the sliding frame 210 may be in a movable state.

The guide stopper elastic support portion 222 may apply elastic force to the guide stopper 221. For example, the guide stopper elastic support portion 222 may apply elastic force in a direction in which the rail 100 is provided to the guide stopper 221.

The guide stopper elastic support portion 222 may include, for example, an upper guide stopper elastic support portion 222a applying elastic force to the upper guide stopper 221a and a lower guide stopper elastic support portion 222b applying elastic force to the lower guide stopper 221b.

The upper guide stopper elastic support portion 222a may apply elastic force to the upper guide stopper 221a in an upward direction. The lower guide stopper elastic support portion 222b may apply elastic force to the lower guide stopper 221b in a downward direction.

The handle module 223 may pull the guide stopper 221 inwardly of the sliding frame 210 by a predetermined length. The handle module 223 may include, for example, a knob 223a, a timing lever 223b, a timing slider 223c, and a connecting wire 223d.

The knob 223a may be rotatably connected to the sliding frame 210. At least a portion of the knob 223a may be exposed to the outside of the sliding frame 210. The user may grip and rotate the knob 223a.

The timing lever 223b may be retractably connected to the knob 223a. The timing lever 223b may slide inwardly or outwardly of the knob 223a depending on a rotational direction of the knob 223a. For example, when the knob 223a rotates in one direction, the timing lever 223b may slide to be drawn inwardly into the knob 223a. When the knob 223a rotates in the other direction, the timing lever 223b may slide outwardly from the knob 223a. The timing lever 223b may include, for example, an upper timing lever 223b-1 connected to an upper portion of the knob 223a and a lower timing lever 223b-2 connected to a lower portion of the knob 223a. When the knob 223a rotates in one direction, the upper timing lever 223b-1 may slide downwardly, and the lower timing lever 223b-2 may slide upwardly. When the knob 223a rotates in the other direction, the upper timing lever 223b-1 may slide upwardly, and the lower timing lever 233b-2 may slide downwardly.

The timing slider 223c may be connected to the timing lever 223b and may move in conjunction with the movement of the timing lever 223b. The timing slider 223c may include an upper timing slider 223c-1 connected to the upper timing lever 223b-1 and a lower timing slider 223c-2 connected to the lower timing lever 223b-2.

The connecting wire 223d may connect the timing slider 223c to the guide stopper 221. The connecting wire 223d may pull the guide stopper 221 toward the inside of the sliding frame 210 by a predetermined length when the timing slider 223c moves toward the inside of the knob 223a. The connecting wire 223d may include an upper connecting wire 223d-1 connected to the upper timing slider 223c-1 and a lower connecting wire 223d-2 connected to the lower timing slider 223c-2. The upper connecting wire 223d-1 may be connected to one of the upper guide stopper 221a or the lower guide stopper 221b. The lower connecting wire 223d-2 may be connected to the other of the upper guide stopper 221a or the lower guide stopper 221b.

When the upper guide stopper 221a is disposed on the upper fixed groove part 135a and the lower guide stopper 221b is disposed on the lower fixed groove part 136a, the sliding frame 210 may be in a fixed state. When the handle module 223 pulls the upper guide stopper 221a and the lower guide stopper 221b toward the inside of the sliding frame 210 in the fixed state of the sliding frame 210, the sliding frame 210 may move in the width direction by repulsive force of the weather strip 240. By the movement of the sliding frame 210, the upper guide stopper 221a may move to the upper movable groove part 135b, and the lower guide stopper 221b may move to the lower movable groove part 136b. A length by which the handle module 223 pulls the upper guide stopper 221a to the inside of the sliding frame 210 may be greater than or equal to a difference in length between the upper fixed groove part 135*a* and the upper movable groove part 135*b* recessed from the bottom surface of the upper rail 110. The length by which the handle module 223 pulls the lower guide stopper 221*b* to the inside of the sliding frame 210 may be greater than or equal to the difference in length between the lower fixed groove part 136*a* and the lower movable groove part 136*b* recessed from the upper surface of the lower rail 120.

By the operation of the handle module 223, the upper guide stopper 221*a* may move from the upper fixed groove part 135*a* to the upper movable groove part 135*b*, and the lower guide stopper 221*b* may move from the lower fixed groove part 136*a* to the lower movable groove part 136*b*.

Figure 18:
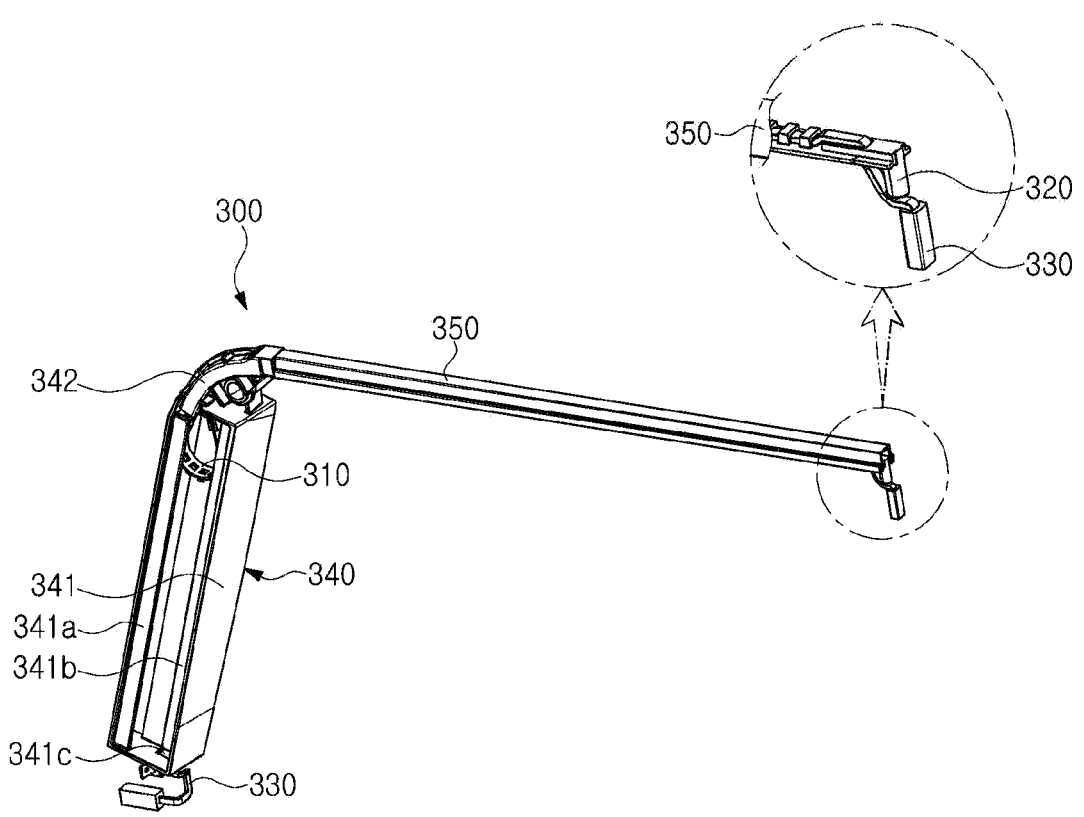
FIG. 18 is a perspective view of a wire harness portion according to an embodiment of the present disclosure.
Figure 19:
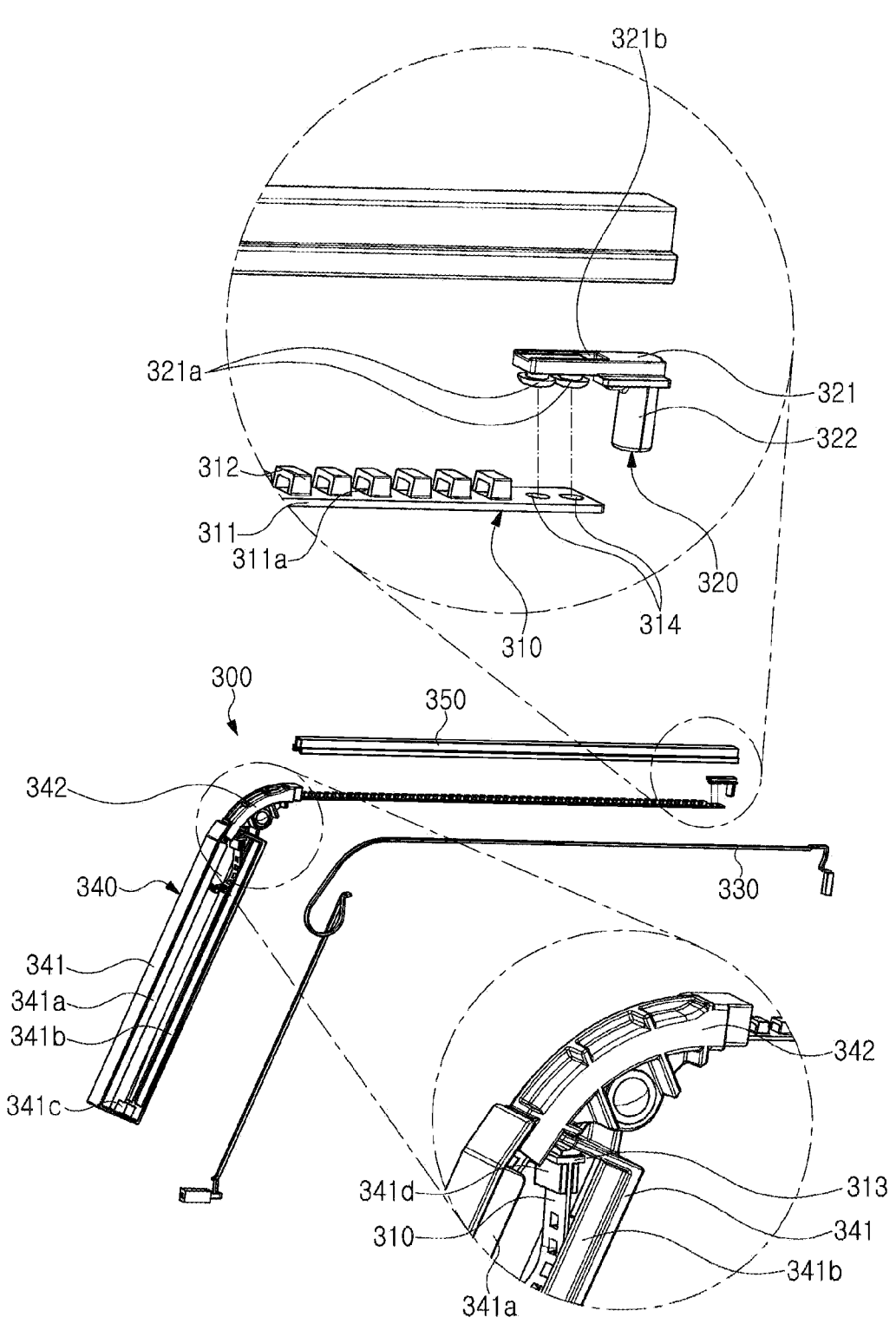
FIG. 19 is an exploded perspective view of a wire harness portion according to an embodiment of the present disclosure.
Figure 20:
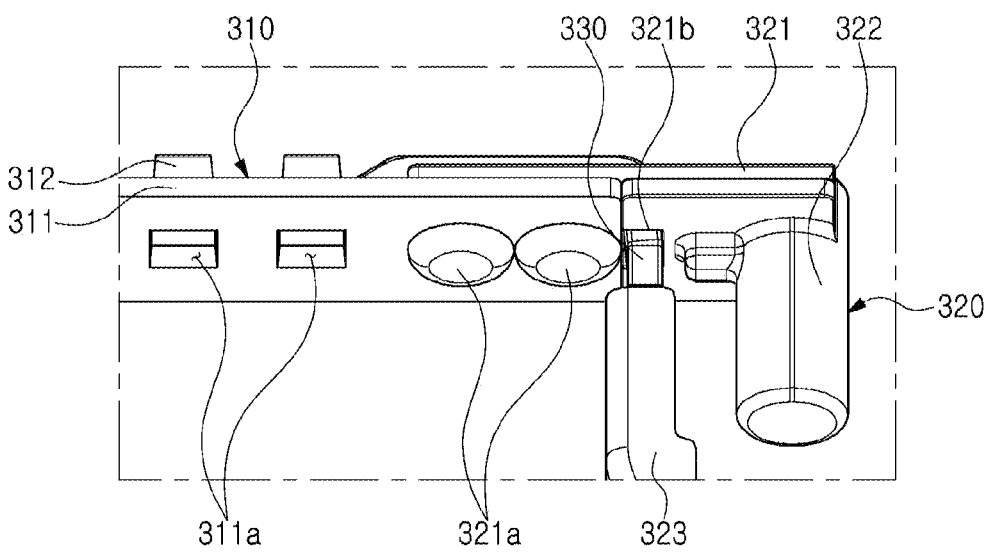
FIG. 20 is a perspective view illustrating a coupling relationship among a cable holder, a cable, and a holder link in a wire harness portion according to an embodiment of the present disclosure.
Figure 21:
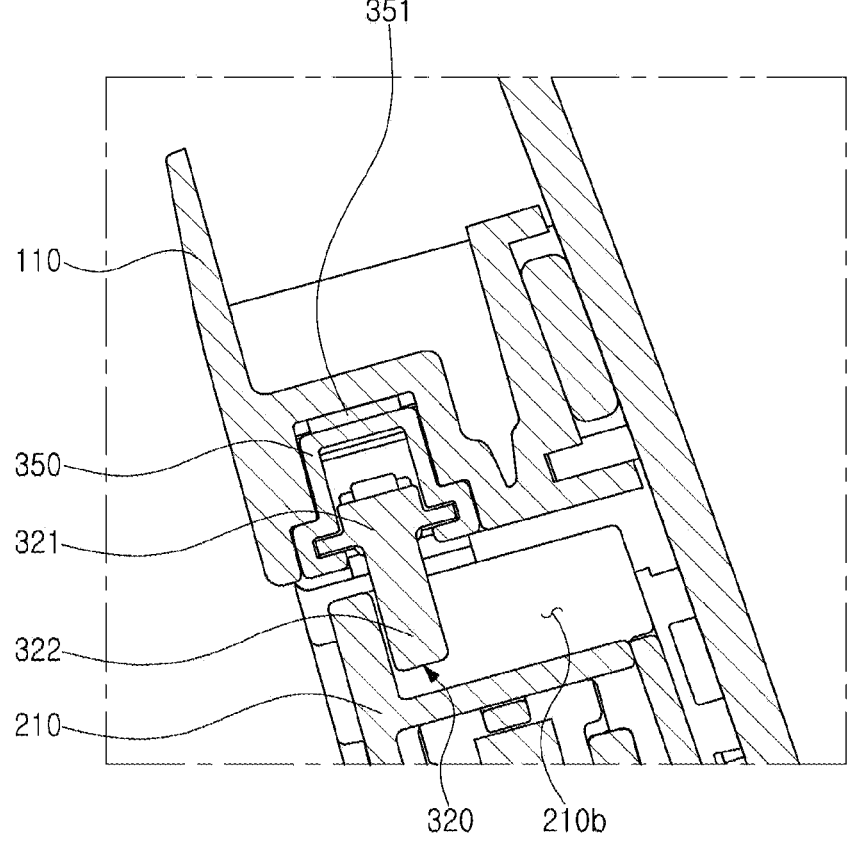
FIG. 21 is a partially cross-sectional view taken along line II-II' of FIG. 2.

FIG. 18 is a perspective view of the wire harness portion according to an embodiment of the present disclosure. FIG. 19 is an exploded perspective view of the wire harness portion according to an embodiment of the present disclosure. FIG. 20 is a perspective view illustrating a coupling relationship among a cable holder, a cable, and a holder link in the wire harness portion according to an embodiment of the present disclosure. FIG. 21 is a partial cross-sectional view taken along line II-II' of FIG. 2.

Referring to FIGS. 18 to 21, the wire harness portion 300 according to an embodiment of the present disclosure may include a cable holder 310, a holder link 320, a cable 330, and a storage case 340.

The cable holder 310 may be disposed to be slidable on the inside of the rail 100. For example, the cable holder 310 may be disposed to be slidable on the inside of the upper rail 110. The cable holder 310 may be inserted into or drawn out of the storage case 340 as it slides.

The cable holder 310 may be connected to the cable 330. The cable holder 310 may support the cable 330 so that the cable 330 may be stably inserted into or drawn from the storage case 340. The cable holder 310 may be formed of soft plastic. For example, the cable holder 310 may be formed using polyethylene, polypropylene, polyvinyl chloride, and/or thermoplastic elastomer. However, the cable holder 310 may be formed using various materials commonly used in the art to which the present disclosure pertains as long as they are materials supporting the cable 330 with flexibility.

The holder link 320 may be connected to one end portion of the cable holder 310. The other end portion of the cable holder 310 may be fixed to the storage case 340.

The cable holder 310 may include, for example, a lower support part 311 supporting at least a portion of a bottom surface of the cable 330 and an upper support part 312 supporting at least a portion of side and upper surfaces of the cable 330. The lower support part 311 may be provided in a band shape extending in the length direction. The lower support part 311 may include at least one lower through-hole 311*a*. The lower through-hole 311*a* may be provided in plural and spaced apart from each other in the length direction of the lower support part 311, for example. The lower support part 311 may include at least one upper support part 312. The upper support part 312 may be provided in plural and spaced apart from each other in the length direction of the lower support part 311, for example. The upper support part 312 may be provided above the lower through-hole 311*a*. At least a portion of the outer surface of the cable 330 may be exposed between the adjacently arranged upper support parts 312.

The lower support part 311 and the upper support part 312 may be provided integrally. For example, the lower support part 311 and the upper support part 312 may be integrally injection-molded. A cable holder fixing part 313 may be provided at an end portion of the cable holder 310. The cable holder fixing part 313 may be fixed to the inside of the storage case 340.

The holder link 320 may connect the cable holder 310 to the sliding glass portion 200. For example, the holder link 320 may connect the cable holder 310 to the sliding frame 210 so as to be slidably moved. The holder link 320 may include, for example, a cable holder connection part 321 connected to the cable holder 310 and a sliding glass portion connection part 322 connected to the sliding glass portion 200. The cable holder connection part 321 may be connected to one end portion of the cable holder 310. For example, the cable holder connection part 321 may be at least partially inserted into and coupled to one end portion of the cable holder 310. In this case, one end portion of the cable holder 310 may include an end through-hole 314. A coupling protrusion 321*a* may be provided on a bottom surface of the cable holder connection part 321. The coupling protrusion 321*a* may be inserted and connected into the end through-hole 314. The cable 330 may be connected to the heating wire 231 inside the sliding glass portion 200 through the cable holder connection part 321. For example, the cable holder connection part 321 may include a cable insertion slit 321*b*. The cable 330 may be inserted into the inside of the sliding frame 210 through the cable insertion slit 321*b* at the top of the cable holder connection part 321. In order to protect the cable 330 and guide the cable 330 stably to the sliding frame 210, a separate connector cover 323 may be provided on the sliding frame 210.

The sliding glass portion connection part 322 may be provided on one end portion of the cable holder connection part 321. For example, the sliding glass portion connection part 322 may be bent downwardly toward the sliding glass portion 200 from one end portion of the cable holder connection part 321. At least a portion of the sliding glass portion connection part 322 may be inserted into the sliding frame 210 of the sliding glass portion 200. For example, an interference prevention groove 210*b* extending in the width direction may be provided on one side of the sliding frame 210, and at least a portion of the sliding glass portion connection part 322 may be inserted into the interference prevention groove 210*b*. Therefore, even when the sliding glass portion 200 moves in the width direction, the sliding glass portion connection part 322 may maintain an initial position regardless of the movement of the sliding glass portion 200 in the width direction.

Figure 22:
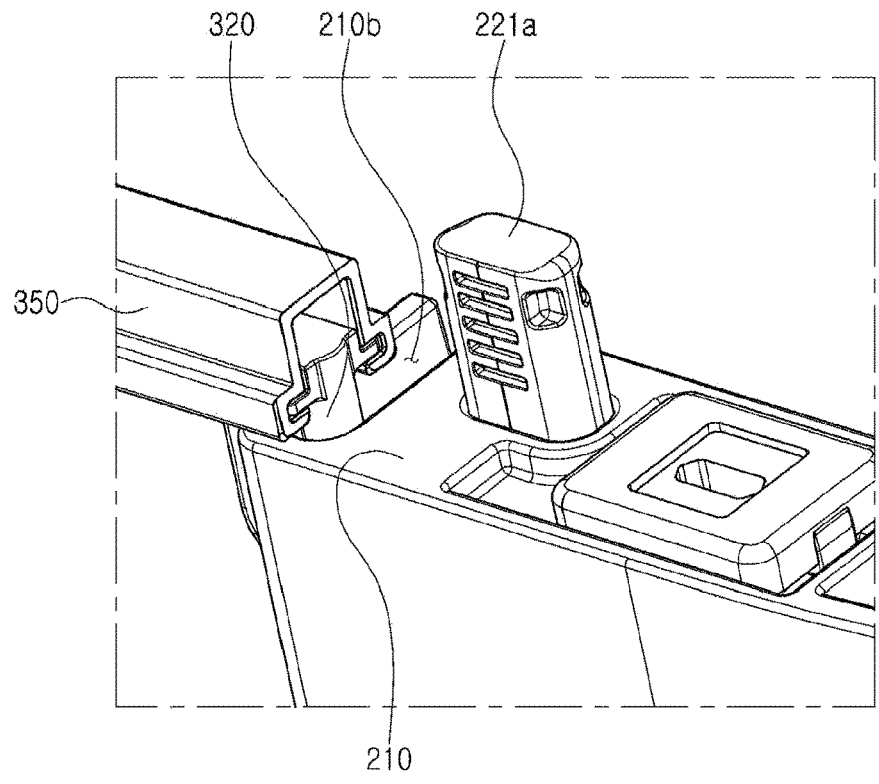
FIG. 22 is a partial perspective view illustrating a coupling relationship between a wire harness portion and a sliding frame when a sliding glass portion is in a fixed state according to an embodiment of the present disclosure.
Figure 23:
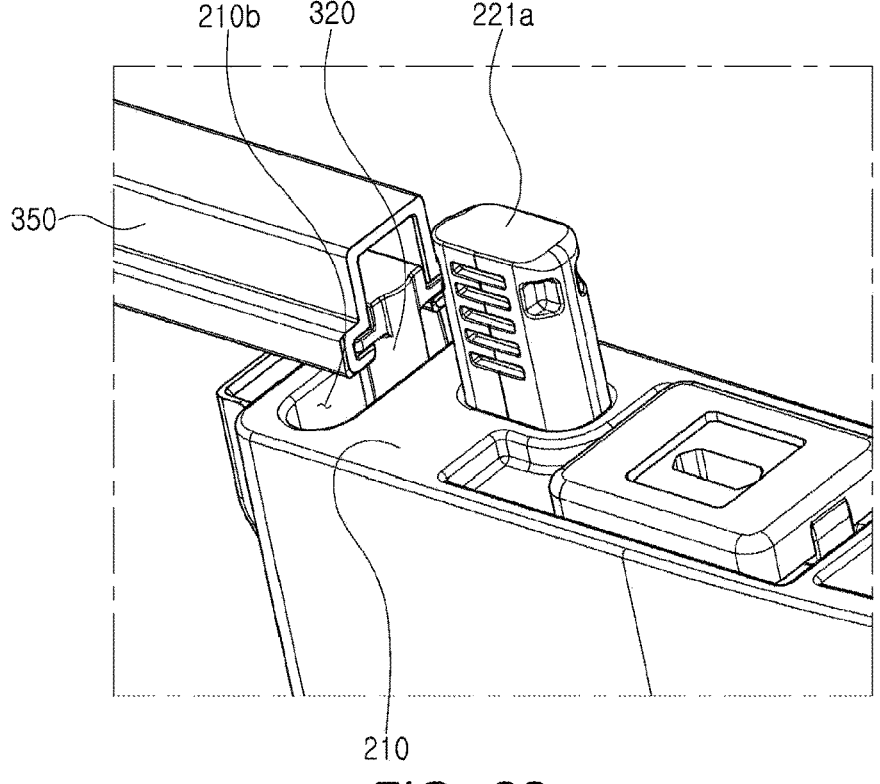
FIG. 23 is a partial perspective view illustrating a coupling relationship between a wire harness portion and a sliding frame when a sliding glass portion is in a movable state according to an embodiment of the present disclosure.

Referring to FIGS. 22 and 23, when the locking portion 220 pulls the guide stopper 221 inwardly of the sliding frame 210 to switch the sliding frame 210 to a movable state, the sliding frame 210 moves by a predetermined distance in the width direction due to repulsive force of the weather strip 240. At this time, the sliding glass portion connection part 322 may maintain the initial position without moving together with the sliding frame 210 by the interference prevention groove 210*b*.

Figure 24:
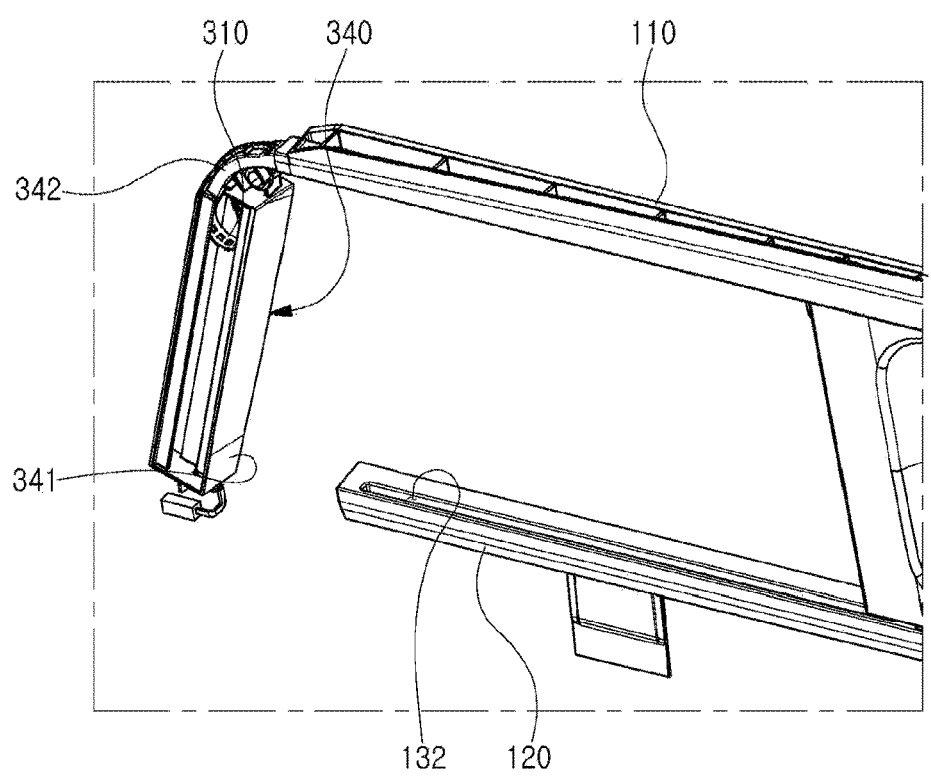
FIG. 24 is a perspective view illustrating a wire harness portion when a sliding glass portion closes an opening of a fixed glass module.
Figure 25:
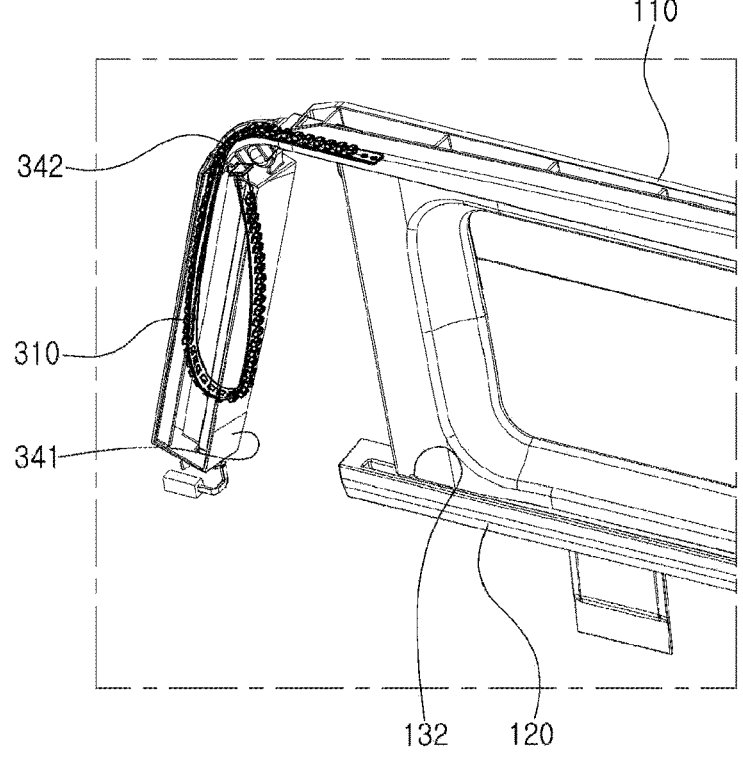
FIG. 25 is a perspective view illustrating a wire harness portion when a sliding glass portion opens an opening of a fixed glass module.

The cable holder 310 and the cable 330 may be stored in the storage case 340 when the sliding glass portion 200 slides. For example, when the sliding glass portion 200 closes the opening 11 of the fixed glass module 10, the cable holder 310 and the cable 330 may be in a state in which they are maximally drawn out from the storage case 340 (see FIG. 24). When the sliding glass portion 200 completely opens the opening 11 of the fixed glass module 10, the cable holder 310 and the cable 330 may be in a state in which they are maximally drawn into the storage case 340 (see FIG. 25).

The storage case 340 may include a storage part 341 and a cable guide part 342. An internal space in which the cable 330 and the cable holder 310 are accommodated may be formed in the storage part 341. An end portion of the cable holder 310 may be fixed to the storage part 341. For example, a cable holder fixing protrusion 341*d* may protrude inside the storage part 341, and the cable holder fixing part 313 of the cable holder 310 may be inserted into the cable holder fixing protrusion 341*d* so that the end portion of the cable holder 310 may be fixed to the storage part 341.

The storage part 341 may include a holder guide panel 341*a* and a cable guide panel 341*b*. The holder guide panel 341*a* may be provided to guide the movement of the cable holder 310 within the storage part 341 when the cable holder 310 is drawn in or out. The holder guide panel 341*a* may prevent the cable holder 310 from escaping in the width direction of the storage part 341 while moving. The cable guide panel 341*b* may be provided to fix the position of a portion of the cable 330 not connected to the cable holder 310 and prevent it from escaping in the width direction. It is also possible to provide the holder guide panel 341*a* and the cable guide panel 341*b* in the form of a single connected panel.

A cable insertion hole 341*c* may be provided on one side of the storage part 341. The cable 330 may pass through the cable insertion hole 341*c* and be connected to an external power source.

The guide part 342 may be connected to the storage part 341 and the rail 100. For example, the guide part 342 may be connected to the rail 100 on one side and connected to the storage part 341 on the other side to guide a movement path of the cable 330 and the cable holder 310. It is also possible to manufacture the guide part 342 and the storage part 341 integrally.

The wire harness portion 300 may further include a guide rail 350. The guide rail 350 may be coupled to the rail 100. The guide rail 350 may be inserted and coupled into the upper guide groove 131 of the rail 100. For example, the guide rail 350 may be coupled to the second upper guide groove 135 of the upper rail 110. The outer surface of the guide rail 350 may have a shape corresponding to the inner surface of the second upper guide groove 135. The guide rail 350 may be inserted into the upper movable groove part 135*b* of the second upper guide groove 135. The guide rail 350 may be adhered to the second upper guide groove 135 using an adhesive or double-sided tape. It is also possible to fix the guide rail 350 to the second upper guide groove 135 using a bolt, etc. When the guide rail 350 is fixed using an adhesive or double-sided tape, an adhesive layer 351 may be formed between the guide rail 350 and the second upper guide groove 135.

The guide rail 350 may support the cable holder 310 and guide the movement of the cable holder 310. For example, the guide rail 350 may support the widthwise edges of the lower support part 311 of the cable holder 310 and guide the movement of the cable holder 310.

An example embodiment described above has a wire harness portion 300 in which the cable 330 is drawn in or out according to the movement of the sliding glass portion 200, can stably connect the cable 330 to the heating wire 231. In an embodiment of the present disclosure, by moving the cable holder 310 and the cable 330 through the rail 100, the problem of the cable 330 being exposed externally and damaged may be prevented.

A sliding glass module and a rear sliding glass assembly according to an embodiment of the present disclosure can stably connect the wire harness to the heating wire.

A sliding glass module and a rear sliding glass assembly according to an embodiment of the present disclosure can improve the water-tightness performance of the system.

A sliding glass module and a rear sliding glass assembly according to an embodiment of the present disclosure can improve the appearance of the product.

A number of embodiments have been disclosed herein. It is understood that various features of the different embodiments can be combined. Example embodiments have been shown and described above, and it can be understood to those skilled in the art that modifications and variations can be made without departing from the scopes of the present disclosure as defined by the appended claims.

What is claimed is:

1. A sliding glass system comprising:

a rail;

a sliding glass portion having a heating wire, wherein the sliding glass portion is slidably connected to the rail; and a wire harness portion configured to supply power to the heating wire, wherein at least part of the wire harness portion is connected to the heating wire via inside of the rail, and wherein the wire harness portion comprises:

a cable holder slidably disposed at least partially inside of the rail, and a holder link disposed at a first end portion of the cable holder and connected to the sliding glass portion, wherein the holder link comprises:

a cable holder connection part connected to the cable holder, and a sliding glass portion connection part disposed on one side of the cable holder connection part and at least partially connected to the sliding glass portion, wherein at least part of the sliding glass portion connection part is inserted into an interference prevention groove extending to the sliding glass portion in a width direction.

2. The sliding glass system of claim 1, wherein the wire harness portion further comprises:

a cable connected to the cable holder and electrically connected to the heating wire; and a storage case into which the cable holder and the cable are drawn in or out based on sliding movement of the sliding glass portion.

3. The sliding glass system of claim 1, further comprising a cable that passes through the cable holder connection part and is connected to the heating wire inside the sliding glass portion.

4. The sliding glass system of claim 2, wherein a second end portion of the cable holder is fixed to the storage case.

5. The sliding glass system of claim 1, wherein the cable holder comprises:

a lower support part supporting at least part of a bottom surface of a cable; and an upper support part supporting at least part of a side surface and an upper surface of the cable.

6. The sliding glass system of claim 5, wherein the upper support part is provided in plural and the plurality of upper support parts are spaced apart from each other in a length direction of the lower support part, and at least part of an outer surface of the cable is exposed between the upper support parts arranged to be adjacent to each other.

7. The sliding glass system of claim 2, wherein the storage case comprises:

a storage part having an internal space configured to accommodate at least part of the cable and the cable holder therein; and a cable guide part having a first cable-guide-part side connected to the rail and a second cable-guide-part side connected to the storage part such that the cable guide part is configured to guide a movement path of the cable and the cable holder.

8. The sliding glass system of claim 1, wherein the wire harness portion further comprises a guide rail coupled to the rail, and wherein the cable holder is configured to slide inside the guide rail based on movement of the sliding glass portion.

9. The sliding glass system of claim 1, wherein the sliding glass portion comprises:

a sliding frame having an opening formed therein;

a locking portion disposed on the sliding frame and selectively fixing the sliding frame to the rail or switching the sliding frame to a slidably movable state;

a sliding glass coupled to a first sliding-frame surface of the sliding frame, wherein the sliding glass is configured to cover the opening of the sliding frame and wherein the sliding glass includes the heating wire; and a weather strip disposed on the sliding frame and wrapped around an edge of the sliding glass.

10. The sliding glass system of claim 9, wherein the locking portion comprises:

a guide stopper having a first guide-stopper side exposed to an outside of the sliding frame and inserted into a guide groove formed in the rail;

a guide stopper elastic support portion configured to apply elastic force to the guide stopper; and a handle module configured to pull the guide stopper into the sliding frame.

11. The sliding glass system of claim 10, wherein the handle module comprises:

a knob rotatably coupled on the sliding frame;

a timing lever connected to the knob and configured to slide inwardly or outwardly of the knob based on a rotational direction of the knob;

a timing slider having a first timing-slider end connected to the timing lever and configured to move in conjunction with movement of the timing lever; and a connecting wire having a first connecting-wire end connected to the timing slider and having a second connecting-wire end connected to the guide stopper.

12. The sliding glass system of claim 10, wherein the rail comprises:

an upper rail disposed above the sliding frame, and a lower rail disposed below the sliding frame; and wherein the guide groove comprises:

an upper guide groove on the upper rail; and a lower guide groove on the lower rail.

13. The sliding glass system of claim 12, wherein the wire harness portion further comprises a guide rail, and wherein the guide rail is inserted into and coupled to the upper guide groove.

14. The sliding glass system of claim 12, wherein the upper guide groove comprises:

a first upper guide groove extending on a first upper-rail-longitudinal side of the upper rail, and a second upper guide groove extending on a second upper-rail-longitudinal side of the upper rail; and wherein the lower guide groove comprises:

a first lower guide groove extending on a first lower-rail-longitudinal side of the lower rail; and a second lower guide groove extending on a second lower-rail-longitudinal side of the lower rail.

15. The sliding glass system of claim 14, wherein the second upper guide groove comprises:

an upper fixed groove part recessed inwardly from a bottom surface of the upper rail by a first depth, and an upper movable groove part recessed inwardly from the bottom surface of the upper rail by a second depth so as to be connected to the upper fixed groove part in a first width direction of the upper rail and extending in a first length direction of the upper rail; and wherein the second lower guide groove comprises:

a lower fixed groove part recessed inwardly from an upper surface of the lower rail by a third depth, and a lower movable groove part recessed inwardly from the upper surface of the lower rail by a fourth depth so as to be connected to the lower fixed groove part in a second width direction of the lower rail and extending in a second length direction of the lower rail.

16. The sliding glass system of claim 15, wherein the guide stopper comprises:

an upper guide stopper inserted into the second upper guide groove; and a lower guide stopper inserted into the second lower guide groove.

17. The sliding glass system of claim 16, wherein the upper guide stopper and the lower guide stopper are respectively arranged in the upper fixed groove part and the lower fixed groove part, and wherein the sliding frame is configured to be movable along the rail based on the upper guide stopper and the lower guide stopper being respectively arranged in the upper movable groove part and the lower movable groove part.

18. A rear sliding glass assembly comprising:

a fixed glass installed in a vehicle, wherein the fixed glass has an opening; and a sliding glass system connected to the fixed glass, wherein the sliding glass system is configured to open and close the opening, and wherein the sliding glass system comprises:

a rail, a sliding glass portion having a heating wire, wherein the sliding glass portion is slidably connected to the rail, and a wire harness portion configured to supply power to the heating wire, wherein at least part of the wire harness portion is connected to the heating wire via an inside rail portion of the rail, and wherein the wire harness portion comprises:

a cable holder slidably disposed at least partially inside of the rail, and a holder link disposed at a first end portion of the cable holder and connected to the sliding glass portion, wherein the holder link comprises:

a cable holder connection part connected to the cable holder, and a sliding glass portion connection part disposed on one side of the cable holder connection part and at least partially connected to the sliding glass portion, wherein at least part of the sliding glass portion connection part is inserted into an interference prevention groove extending to the sliding glass portion in a width direction.

19. The sliding glass system of claim 18, wherein the sliding glass portion comprises:

a sliding frame having an opening formed therein, a locking portion disposed on the sliding frame and selectively fixing the sliding frame to the rail or switching the sliding frame to a slidably movable state, a sliding glass coupled to a first sliding-frame surface of the sliding frame, wherein the sliding glass is configured to cover the opening of the sliding frame and wherein the sliding glass includes the heating wire, and a weather strip disposed on the sliding frame and wrapped around an edge of the sliding glass; and wherein the locking portion comprises:

a guide stopper having a first guide-stopper side exposed to an outside of the sliding frame and inserted into a guide groove formed in the rail, a guide stopper elastic support portion configured to apply elastic force to the guide stopper, and a handle module configured to pull the guide stopper into the sliding frame.

20. A vehicle comprising:

a vehicle cabin including a rear window opening; and a sliding glass system disposed in the rear window opening, wherein the sliding glass system comprises:

a rail, a sliding glass portion having a heating wire, wherein the sliding glass portion is slidably connected to the rail, and a wire harness portion configured to supply power to the heating wire, wherein at least part of the wire harness portion is connected to the heating wire via inside of the rail, and wherein the wire harness portion comprises:

a cable holder slidably disposed at least partially inside of the rail, and a holder link disposed at a first end portion of the cable holder and connected to the sliding glass portion, wherein the holder link comprises:

a cable holder connection part connected to the cable holder, and a sliding glass portion connection part disposed on one side of the cable holder connection part and at least partially connected to the sliding glass portion, wherein at least part of the sliding glass portion connection part is inserted into an interference prevention groove extending to the sliding glass portion in a width direction.

* * * * *